United States Patent
Wang

(10) Patent No.: US 10,921,682 B1
(45) Date of Patent: Feb. 16, 2021

(54) INTEGRATED OPTICAL PHASE MODULATOR AND METHOD OF MAKING SAME

(71) Applicant: KVH Industries, Inc., Middletown, RI (US)

(72) Inventor: Liming Wang, Tinley Park, IL (US)

(73) Assignee: KVH Industries, Inc., Middletown, RI (US)

( * ) Notice: Subject to any disclaimer, the term of this patent is extended or adjusted under 35 U.S.C. 154(b) by 0 days.

(21) Appl. No.: 16/543,140

(22) Filed: Aug. 16, 2019

(51) Int. Cl.
G02F 1/225 (2006.01)
G02F 1/025 (2006.01)

(52) U.S. Cl.
CPC ............. *G02F 1/225* (2013.01); *G02F 1/025* (2013.01)

(58) Field of Classification Search
CPC .................................. G02F 1/025; G02F 1/225
See application file for complete search history.

(56) References Cited

U.S. PATENT DOCUMENTS

| | | |
|---|---|---|
| 4,678,267 A | 7/1987 | Burns |
| 4,842,358 A | 6/1989 | Hall |
| 4,890,922 A | 1/1990 | Wilson |
| 4,938,594 A | 7/1990 | Pavlath |
| 4,969,742 A | 11/1990 | Falk |
| 5,037,205 A | 8/1991 | Pavlath |
| 5,194,917 A | 3/1993 | Regener |
| 5,223,911 A | 6/1993 | Suchoski |
| 5,363,457 A * | 11/1994 | Falt ...................... G02F 1/025 385/3 |
| 5,436,992 A | 7/1995 | Wang |
| 5,579,424 A | 11/1996 | Schneider |
| 5,600,745 A | 2/1997 | Wuu |

(Continued)

FOREIGN PATENT DOCUMENTS

| | | |
|---|---|---|
| CN | 107843957 A | 3/2018 |
| EP | 0279603 A2 | 8/1988 |

(Continued)

OTHER PUBLICATIONS

Bauters, et al., "Ultralow-Loss Planar Si3N4 Waveguide Polarizers," IEEE Photonics Journal, 5(1), Article S/N: 6600207 (2013).

(Continued)

*Primary Examiner* — Daniel Petkovsek
(74) *Attorney, Agent, or Firm* — Hamilton, Brook, Smith & Reynolds, P.C.

(57) ABSTRACT

A low propagation loss and loose fabrication tolerance waveguide for a photonic integrated circuit (PIC) device may be realized by using a weak optical confinement to the optical mode, through designing a waveguide of single or double thin strips with high aspect ratio as waveguide core. To introduce a modulation functionality on this type of PIC device, a thin-film electrooptic material may be incorporated to form a hybrid phase modulating device, where a material that can be processed easily may be used as a device layer and is bonded to, or deposited with, a thin electrooptic film that may otherwise be difficult to fabricate or process. A low insertion loss, compact size and high-efficiency phase modulator on PIC device with this type of weakly confined waveguide is disclosed.

31 Claims, 16 Drawing Sheets
(11 of 16 Drawing Sheet(s) Filed in Color)

(56) References Cited

U.S. PATENT DOCUMENTS

| | | | |
|---|---|---|---|
| 5,729,641 A | 3/1998 | Chandonnet | |
| 5,838,844 A | 11/1998 | Van Dam | |
| 5,946,434 A | 11/1999 | Lee | |
| 5,982,961 A | 11/1999 | Pan | |
| 6,108,086 A | 8/2000 | Michal | |
| 6,163,632 A | 12/2000 | Rickman | |
| 6,293,688 B1 | 9/2001 | Deacon | |
| 6,360,038 B1 | 3/2002 | Grubsky | |
| 6,445,455 B1 | 9/2002 | Hall | |
| 6,584,240 B2 * | 6/2003 | Doi | G02F 1/2255 385/2 |
| 6,680,472 B1 | 1/2004 | Thingboet | |
| 6,760,520 B1 | 7/2004 | Medin | |
| 6,778,751 B2 * | 8/2004 | Tada | G02F 1/025 385/131 |
| 6,920,257 B1 | 7/2005 | Mekis | |
| 7,061,610 B2 | 6/2006 | Mittelstein | |
| 7,085,441 B1 | 8/2006 | Kozlov | |
| 7,218,809 B2 | 5/2007 | Zhou | |
| 7,224,878 B1 | 5/2007 | Wessels | |
| 7,426,326 B2 * | 9/2008 | Moeller | G02F 1/0356 385/40 |
| 7,711,214 B2 * | 5/2010 | Tsuzuki | G02F 1/025 359/248 |
| 7,783,146 B2 * | 8/2010 | Blauvelt | G02B 6/12002 385/30 |
| 7,899,286 B2 | 3/2011 | Yoshida | |
| 8,121,874 B1 | 2/2012 | Guheen | |
| 9,664,931 B1 * | 5/2017 | Yap | G02F 1/2255 |
| 9,739,938 B2 | 8/2017 | Shi | |
| 9,746,612 B2 | 8/2017 | Lipson | |
| 9,952,456 B2 * | 4/2018 | Huang | G02F 1/015 |
| 10,108,789 B2 | 10/2018 | Lehmann et al. | |
| 10,274,319 B2 | 4/2019 | Wang | |
| 10,488,596 B2 | 11/2019 | Akiyama | |
| 2002/0197037 A1 | 1/2002 | Bailey | |
| 2002/0024786 A1 | 2/2002 | Shearon et al. | |
| 2003/0081902 A1 | 5/2003 | Blauvelt | |
| 2004/0057667 A1 | 3/2004 | Yamada | |
| 2004/0168234 P1 | 8/2004 | Fischer | |
| 2004/0223695 A1 | 11/2004 | Kersten | |
| 2005/0021348 A1 | 1/2005 | Chan | |
| 2005/0025427 A1 | 2/2005 | Dougherty | |
| 2006/0133754 A1 * | 6/2006 | Patel | G02B 6/122 385/129 |
| 2006/0251849 A1 | 11/2006 | Blauvelt | |
| 2007/0053625 A1 | 3/2007 | Ichioka | |
| 2007/0229838 A1 | 10/2007 | Greening | |
| 2008/0291459 A1 | 11/2008 | Meyer | |
| 2009/0087144 A1 | 4/2009 | Yoshida | |
| 2010/0137849 A1 | 6/2010 | Bhandari | |
| 2013/0202250 A1 | 8/2013 | Guattari | |
| 2013/0308897 A1 | 11/2013 | Sercel | |
| 2014/0075357 A1 | 3/2014 | Flores | |
| 2014/0185979 A1 | 7/2014 | Evans | |
| 2014/0376083 A1 | 12/2014 | Onaka | |
| 2015/0021291 A1 | 1/2015 | Shastri | |
| 2015/0212271 A1 | 7/2015 | Chen | |
| 2015/0277042 A1 | 10/2015 | Goodwill | |
| 2015/0277156 A1 | 10/2015 | Kondou | |
| 2017/0131472 A1 | 5/2017 | Kobyakov | |
| 2017/0168234 A1 | 6/2017 | Shi | |
| 2017/0205578 A1 | 7/2017 | Van Thourhout | |
| 2017/0205583 A1 | 7/2017 | Bennett | |
| 2017/0329082 A1 | 11/2017 | Ma | |
| 2018/0120504 A1 | 5/2018 | Qi | |
| 2019/0086614 A1 | 3/2019 | Wang | |
| 2020/0371286 A1 | 11/2020 | Wang | |

FOREIGN PATENT DOCUMENTS

| | | | |
|---|---|---|---|
| EP | 0893671 | | 1/1990 |
| EP | 0379520 A1 | | 8/1990 |
| EP | 0883000 A1 | | 12/1998 |
| EP | 1025422 A1 | | 8/2000 |
| EP | 1396741 A1 | | 3/2004 |
| EP | 2096408 A2 | | 4/2008 |
| EP | 2246663 A2 | | 11/2010 |
| GB | 2201256 A | | 8/1988 |
| JP | H09159869 A | | 6/1997 |
| JP | 2007025583 A | * | 2/2007 ............... G02F 1/01 |
| JP | 20070272121 A | | 10/2007 |
| JP | 20120215901 A | | 11/2012 |
| WO | 198901534 A1 | | 11/1989 |
| WO | 2018165238 A1 | | 9/2018 |
| WO | 2018175524 A1 | | 9/2018 |
| WO | 2019055663 A1 | | 3/2019 |
| WO | 2020077216 A1 | | 4/2020 |
| WO | 2020092789 A1 | | 5/2020 |

OTHER PUBLICATIONS

Cheng, Z.J., et al., "Polymer-waveguide-based vertical coupler", Optics Communications, vol. 260, No. 2, Apr. 15, 2006.

Florjanczyk, M., et al, "Tiny spectrometer enables cost-effective space-borne sensing" SPIE Newsroom, 10.1117/2.1200912.002524, 2009.

Garanovich, I., et al., "Nonlinear directional coupler for polychromatic light", Optics Letters vol. 32, Issue 5, pp. 475-477 (2007).

Hammer, M., et al., "Hybrid coupled-mode modeling in 3D: perturbed and coupled channels, and waveguide crossings", Journal of Optical Society of America, vol. 34, No. 3, Mar. 1, 2017.

Hatta, A.M., et al., "A simple integrated ratiometric wavelength monitor based on a directional coupler", Optik 125 (2014) 795-798.

Hatta, A.M., et al. "Design of the optical core of an integrated ratiometric wavelength monitor" Proceedings 14th European Conference on Integrated Optics: ECIO 08 Eindhoven: Jun. 11-13, 2008, Eindhoven University of Technology, The Netherlands, paper, ThP25.

Humaira, Z., et al: "Integrated silicon photonic TE-pass polarizer", 2016 Photonics North (PN), IEEE, May 24, 2016 (May 24, 2016).

Lallier, E., et al., "Laser Oscillation of Single-Mode Channel Waveguide in Nd:MgO:LiNb03", Electronic Letters, IEEE Stevenage, GB, vol. 26, No 22, Oct. 26, 1989.

Leijtens, X., et al., "Arrayed Waveguide Gratings", in "Wavelength Filters in Fibre Optics", vol. 123 of the series Springer Series in Optical Sciences pp. 125-187 (date unknown).

Muneeb, M., et al., "Silicon-on-insulator shortwave infrared wavelength meter with integrated photodiodes for on-chip laser monitoring", Nov. 3, 2014 | vol. 22, No. 22 | DOI:10.1364/OE.22.027300 | Optics Express 27300.

Seyringer, D., et al., "Arrayed Waveguide Gratings", SPIE Press Book, Date Published: Jun. 3, 2016, ISBN: 9781510603608, vol. SL16.

Shang. K., et al., "Low-loss compact multilayer silicon nitride platform for 3D photonic integrated circuits" Optics Express, vol. 23, No. 16, Aug. 6, 2015.

Srinivasan, S., et al., "Design of integrated hybrid silicon waveguide optical gyroscope", Optics Express 24988, vol. 22, No. 21, Oct. 20, 2014.

Tan, Y. et al., "Polarization-selective microring resonators", Optics Express, vol. 25, No. 4, Feb. 15, 2017 (Feb. 15, 2017).

Tran, M., et al., "Integrated optical driver for interferometric optical gyroscopes", Optics Express 3827,vol. 25, No. 4. Feb. 20, 2017.

Wang, P., et al., "Passive photonic integrated ratiometric wavelength monitor with resolution better than 15 pm", vol. 25, No. 3 | Feb. 6, 2017 | Optics Express 2940.

Wang, P., et al. "Wavelength Measurement Based on a Silicon-on-Insulator Directional Coupler Integrated Device", Sensors 2015, 15 21281.

Yu, C., et al., "Stable and Compact Optical Module for Fiber-Optic Gyroscope Application", Fiber and Integrated Optics, 33:306-314, 2014.

International Search Report and Written Opinion for PCT/US2018/021262 dated Jun. 15, 2018 entitled "Photonic Integrated Circuit for an Interference Fiber Optic Gyroscope (IFOG)".

(56) References Cited

OTHER PUBLICATIONS

International Search Report and Written Opinion for PCT/US2018/023472 dated Jun. 29, 2018 entitled "Integrated Optic Wavemeter and Method for Fiber Optic Gyroscopes Scale Factor Stabilization".
International Search Report and Written Opinion for PCT/US2018/050896 dated Jan. 7, 2019 entitled "Method and Apparatus for Self-Alignment Connection of Optical Fiber to Waveguide of Photonic Integrated Circuit".
International Search Report and Written Opinion for PCT/US2019/055849 dated Mar. 11, 2020, titled "Photonic Integrated Circuits, Fiber Optic Gyroscopes and Methods for Making the Same".
International Search Report and Written Opinion for PCT/US2019/059195 dated Jan. 16, 2020 entitled "Method and Apparatus for Control and Suppression of Stray Light in a Photonic Integrated Circuit".
International Search Report and Written Opinion for PCT/US2020/033092 dated Sep. 4, 2020 titled "Integrated Optical Polarizer and Method of Making Same".
Lu, M. et al., "Field Patterns of the TE Modes in Ridge-Trough Waveguide", International Journal of Infrared and Millimeter Waves, Kluwer Academic Publishers-Plenum Publishers, NE, vol. 23, No. 8, Aug. 1, 2002.
Pu, M et al., "Ultra-low-loss inverted taper coupler for silicon-on-insulator ridge waveguide", Optics Communications, Elsevier, Amsterdam, NL, vol. 283, No. 19, Oct. 1, 2010.
International Search Report and Written Opinion for PCT/US2020/045877 dated Nov. 9, 2020 titled "Integrated Optical Phase Modulator and Method of Making Same".

\* cited by examiner

INTEGRATED OPTICAL PHASE MODULATOR AND METHOD OF MAKING SAME

BACKGROUND

Photonic integrated phase modulators may be used in various optic system comprising PIC devices including for example optical switching, timing and ranging, transmitters/transceivers in data communication, fiber optic gyroscopes (FOGs), radio frequency (RF) photonics, high-bandwidth signal generation, optical neural networks (ONNs), solid state light detection and ranging (LIDAR) devices, and others. In these devices, the optical phase modulator may be used to cause a phase shift of light propagating in, for example, an interferometer, a directional coupler, an optical micro-ring resonator, or a phase array. The interferometers may include a Mach-Zehnder interferometer or a Sagnac interferometer to convert electric signal to optical signal, or convert optical phase shift to optical amplitude signal, or perform matrix multiplications. Refractive modulators, in which phase shifts are caused by varying the refractive index of the light transmitting medium, may make use of a Pockels electro-optic effect to change the phase of a light beam, or to change or produce birefringence in an optical medium induced by an electric field.

It has been widely recognized that the material properties of lithium niobate ($LiNbO_3$) are well suited for realizing ultra-fast modulation, low-voltage operation and low optical losses at the same time. The strong electro-optic effect in $LiNbO_3$ leads to a linear change of its refractive index in response to an applied voltage, on femtosecond timescales. However, conventional $LiNbO_3$ waveguides using ion diffusion on monocrystalline substrates suffer several disadvantages. The low refractive index contrast (e.g., $\Delta n<0.02$) between core and cladding results in large optical mode areas. The weak optical confinement requires metal electrodes to be spaced far apart from the optical waveguide, lowering the electro-optic efficiency. The traditional design and fabrication approach of $LiNbO_3$ modulators, based on ion exchange or implantation into bulk $LiNbO_3$, is a relatively time-consuming, expensive, and labor-intensive process, which is not compatible with the complex, multifunctional integrated optics microchips currently being developed and deployed. Furthermore, although multifunction optic integrated circuit based on a $LiNbO_3$ substrate was recognized early on as a very promising technology for FOGs, further reducing the circuit size or further increasing the degree of integration have proved to be challenging with respect to FOG performance. This is because the optic anisotropicity of the crystalline material restricts the degree of freedom of the optic circuit layout to one dimension, so that curvature of the connecting base wave guide cannot be implemented. Other methods for integrated circuit fabrication are difficult to implement partly due to difficulties associated with $LiNbO_3$ dry etching, which typically results in optical waveguides with high optical loss.

Besides $LiNbO_3$ film, thin films of various electrooptic (EO) materials have been developed, the applications of which may include phase modulation. These materials include simple inorganic compounds (e.g., ZnO, $VO_2$, etc.), ferroelectric materials (e.g., $PbTiO_3$, $BaTiO_3$, $PbZr_xTi_{1-x}O_3$, $SrTiO_3$ $Pb_xSr_{1-x}TiO_3$, $Pb_xLa_{1-x}Zr_yTi_{1-y}O_3$, etc., where $x\le 1$ and $y\le 1$), polymeric or organic electrooptic materials (e.g., poled, or self-assembled films). Film fabrication processes may include sputtering, chemical vapor deposition, laser deposition, solution crystallization, sol-gel spin on and annealing, spin-coating and poling, Langmuir-Blodgett molecular assembling, among others. Some of these electrooptic materials have large electrooptic coefficients and can be fabricated into clear optical films, but the waveguides made of these materials are generally not suitable for large scale photonic integrations, partly due to high waveguide loss and/or incompatible film making process.

Materials for PICs that are compatible with standard complementary-metal-oxide semiconductor (CMOS) technology, such as silicon nitride (SiN), may present a promising platform for integrated photonics applications. The ongoing evolution in the microelectronics industry may facilitate a feasible cost reduction at large fabrication scales for such materials. Among the various CMOS compatible optical materials, SiN has advantages that make it compete favorably with silicon for certain applications. The refractive index contrast is not as high as with silicon, thus significantly reducing scattering losses and resulting in PIC devices that are more tolerant to fabrication imperfections. Two photon absorption at near-infrared wavelengths is negligible, thereby contributing to production of low-loss PIC devices. Finally, the transparency in the near-infrared and visible spectrum of SiN opens a wide range of new possibilities for CMOS-compatible integrated photonics applications, such as biosensing in the visible and near-infrared regime and compact FOGs. To further reduce the propagation loss and loosen the fabrication tolerance, waveguides with weak optical confinement are usually used as a base waveguide of a PIC device, for example, through designing a waveguide having core of one or more SiN strips with a high aspect ratio (i.e., high width-to-height ratio).

SUMMARY

To generate a modulation functionality on the passive PIC devices, thin-film EO material, including lithium niobate ($LiNbO_3$) on an insulator, is a promising material platform, where an easy-to-etch material (e.g., SiN) may be used as a device layer, which is bonded to or deposited on non-etched thin EO films. Though promising results on these heterogeneous platforms have shown with thick SiN waveguide (>200 nm), a hybrid waveguide with a SiN core that is thin (<100 nm) and has a high aspect ratio (i.e., a width-to-height ratio that is greater than 10) may still have poor performance, such as high transition loss, large device size and low modulation efficiency. The embodiments described herein present an improved design of a phase modulator on PIC device, which is based on a weakly-confined waveguide, and which employs electrooptic materials.

In one aspect, the invention may be an integrated optical phase modulator comprising a photonic integrated circuit (PIC), a first electrode and a second electrode, and an electrooptic film. The PIC may be configured as a modulator waveguide structure comprising a base waveguide core, a ridge, and cladding. The base waveguide core may have a rectangular cross-section with a width-to-height ratio of greater than or equal to ten (10). A ridge may be disposed on the base waveguide core. The ridge may have a first end and a second end, each of which is shaped into a width-wise taper. The ridge may have a top surface that is coplanar with an upper surface of the modulator wave guide structure. The cladding may be disposed beneath and on each side of the modulator waveguide structure. The first electrode and a second electrode may be disposed on the upper surface of the modulator waveguide structure. The first electrode and the second electrode may be coplanar with the base waveguide core and may be disposed on opposing sides of the base waveguide core at a predetermined distance from the base waveguide core. The electrooptic (EO) film may be characterized by a refractive index that changes in response to an electric field applied to the electrooptic film. The electrooptic film may be disposed on the upper surface of the modulator waveguide structure, so that it overlays the base waveguide core, the ridge, the first electrode, and the second electrode.

The base waveguide core may comprise silicon nitride (SiN), and the cladding comprises silicon dioxide ($SiO_2$). Each of the width-wise tapers may have a predetermined taper slope, and the width wise taper slope at the first end of the ridge may be the same as the predetermined taper slope at the second end of the ridge. The electrooptic film may have a higher refractive index than a refractive index of the base waveguide core. The electrooptic film may comprise lithium niobate (LiNbO3). The electrooptic film may comprise a ferroelectric material selected from $PbTiO_3$, $BaTiO_3$, $PbZr_xTi_{1-x}O_3$, $SrTiO_3$, $Pb_xSr_{1-x}TiO_3$, and $Pb_xLa_{1-x}Zr_yTi_{1-y}O_3$, where $x \leq 1$ and $y \leq 1$. The electrooptic film may comprise one or both of (i) polymeric electrooptic material and (ii) organic electrooptic material.

In another aspect, the invention may be an integrated optical phase modulator comprising a photonic integrated circuit (PIC), a first electrode and a second electrode, and an electrooptic film. The PIC may be configured as a modulator waveguide structure. The modulator waveguide structure may comprise a base waveguide core, a ridge, a trough, and cladding. The base waveguide core may have a rectangular cross-section with a width-to-height ratio of greater than or equal to ten (10). The ridge, which may be disposed on the base waveguide core, may have a first end and a second end, each of which may be shaped into a width-wise taper. The ridge may have a top surface that is coplanar with an upper surface of the modulator wave guide structure. The trough may be formed in the top surface of the ridge in a lengthwise direction of the base waveguide core. The trough may have a length less than a length of the ridge, and a height not exceeding a height of the ridge. The cladding may be disposed beneath and on each side of the modulator waveguide structure. The first electrode and second electrode may be disposed on the upper surface of the modulator waveguide structure. The first electrode and the second electrode may be coplanar with the base waveguide core and disposed on opposing sides of the base waveguide core at a predetermined distance from the base waveguide core. The electrooptic film may be characterized by a refractive index that changes in response to an electric field applied to the electrooptic film. The electrooptic film may be disposed on a substrate that has a lower refractive index than that of the electrooptic film, and the electrooptic film may be arranged such that a surface of the electrooptic film is in contact with a surface of the trough and overlaying the base waveguide core, the ridge, the first electrode, and the second electrode.

The electrooptic film may have a thickness substantially the same as the trough height, a length shorter than the trough length, and a width greater than a width of the ridge. The surface of the electrooptic film may be bonded to the surface of the trough with an adhesive.

In another aspect, the invention may be an integrated optical phase modulator comprising a photonic integrated circuit (PIC), a first electrode and a second electrode, and an electrooptic film. The PIC may be configured as a modulator waveguide structure that comprises a base waveguide core, a ridge, and cladding. The base waveguide core may have an upper strip and a lower strip spaced in a vertical direction by a predetermined distance and placed symmetrically with respect to a vertical axis, each of the upper strip and the lower strip having a rectangular cross-section with a width-to-height ratio of greater than or equal to ten (10). The ridge may be disposed on the upper strip of the base waveguide core. The ridge may have a first end and a second end, each of which is shaped into a width-wise taper. The ridge may have a top surface that is coplanar with an upper surface of the modulator wave guide structure. The cladding may be disposed beneath and on each side of the modulator waveguide structure. The first electrode and a second electrode may be disposed on the upper surface of the modulator waveguide structure. The first electrode and the second electrode may be coplanar with the base waveguide core and may be disposed on opposing sides of the base waveguide core at a predetermined distance from the base waveguide core. The electrooptic (EO) film may be characterized by a refractive index that changes in response to an electric field applied to the electrooptic film. The electrooptic film may be disposed on the upper surface of the modulator waveguide structure, so that it overlays the base waveguide core, the ridge, the first electrode, and the second electrode.

In another aspect, the invention may be an integrated optical phase modulator comprising a photonic integrated circuit (PIC), a first electrode and a second electrode, and an electrooptic film. The PIC may be configured as a modulator waveguide structure, which may comprise a base waveguide core, a ridge, a trough, and cladding. The base waveguide core may have a rectangular cross-section with a width-to-height ratio of greater than or equal to 10. The ridge may be disposed on the base waveguide core. The ridge may have a first end and a second end, each of which is shaped into a width-wise taper. The ridge may have a top surface that is coplanar with an upper surface of the modulator wave guide structure. The trough may be formed in the top surface of the ridge in a lengthwise direction of the base waveguide core. The length of the trough may be less than the length of the ridge, and the height of the trough may not exceed the height of the ridge. The cladding may be disposed beneath and on each side of the modulator waveguide structure. The first electrode and the second electrode may be disposed on the upper surface of the modulator waveguide structure. The first electrode and the second electrode may be coplanar with the base waveguide core and disposed on opposing sides of the base waveguide core at a predetermined distance from the base waveguide core. The electrooptic film may be characterized by a refractive index that changes in response to an electric field applied to the electrooptic film. The electrooptic film may be disposed on a substrate that has a lower refractive index than that of the electrooptic film. The electrooptic film may be arranged such that a surface of the electrooptic film is in contact with a surface of the trough and the electrooptic film overlays the base waveguide core, the ridge, the first electrode, and the second electrode. The surface of the electrooptic film may be bonded to the surface of the trough with an adhesive.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The teachings of all patents, published applications and references cited herein are incorporated by reference in their entirety.

Figure 1A:
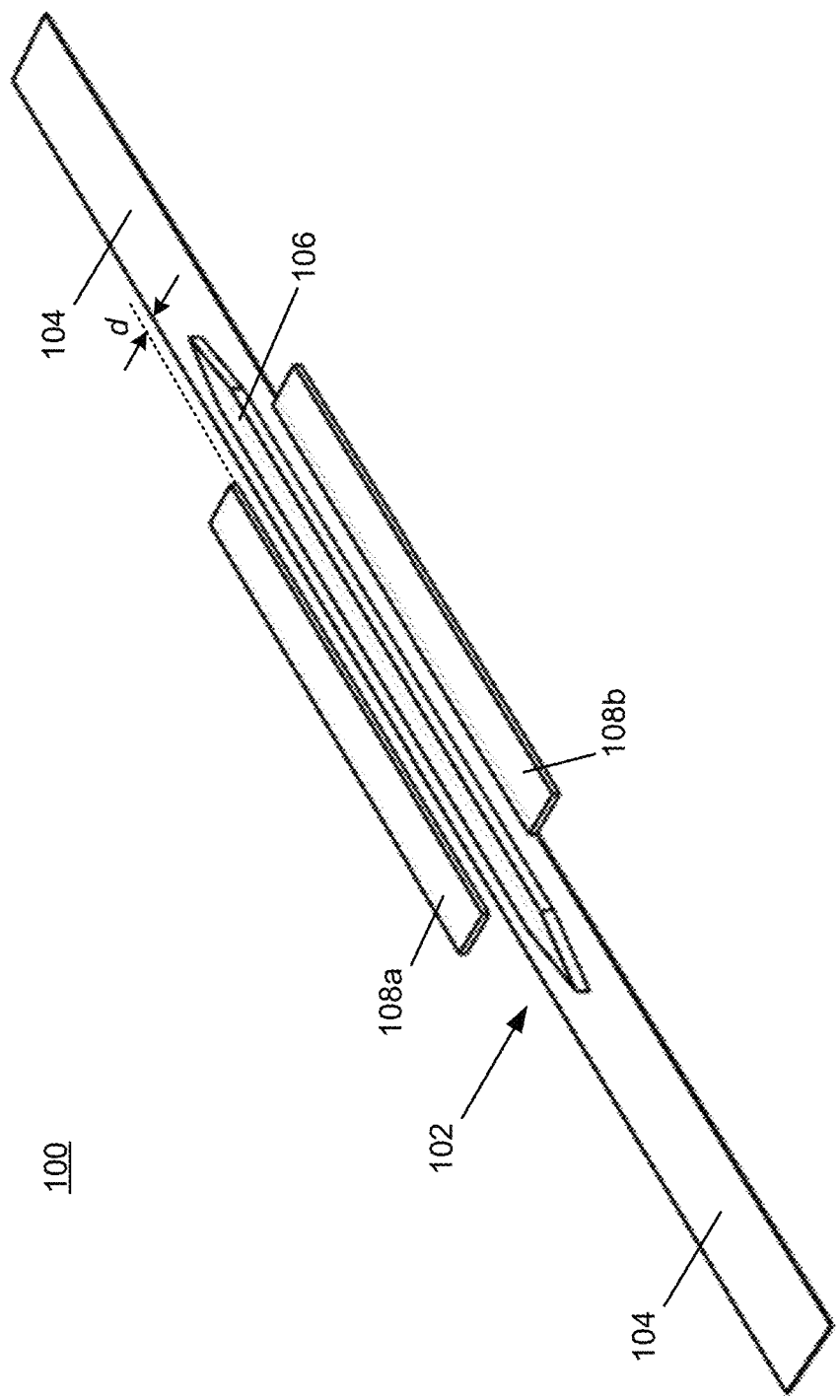
FIG. 1A shows an example embodiment of a modulator waveguide structure of an integrated optical phase modulator, according to the invention.

FIG. 1A shows an example embodiment of the modulator waveguide structure 102 of an integrated optical phase modulator 100, according to the invention. The modulator waveguide structure 102 may be formed by fabricating a waveguiding core material into a shape illustrated in the FIG. 1A. The modulator waveguide structure 102 comprises a waveguide core surrounded by a cladding material (not shown for clarity of the illustration) that has a lower refractive index than that of the core material. In the example embodiment, the core material is silicon mononitride (SiN) and the cladding is silicon dioxide ($SiO_2$), although other core and cladding compositions may be used as described herein.

The modulator waveguide structure 102 comprises a base waveguide core 104 of rectangular cross-section that may be thin and have a high aspect ratio (i.e., high width-to-height ratio), and a ridge waveguide section 106 with predetermined height and width that is built on the top of the base waveguide core 104. Both ends of the ridge waveguide section 106 are shaped into an in-plane taper, such that when transiting from the base waveguide core 104 into the ridge waveguide section 106, the height of the ridge waveguide section 106 may remain unchanged, but its width gradually increases from very narrow at each end (e.g., narrow to the limit of microfabrication accuracy), to a constant width of the central portion of the ridge waveguide section, and vice versa for the transition from the ridge waveguide section 106 to the base waveguide core 104.

The length of the ridge waveguide section 106 may be selected to achieve a desired $V_\pi L$ at a predetermined modulating voltage applied to the electrodes 108a, 108b. The pair of electrodes 108a, 108b, are arranged in parallel with, and on both sides of, the modulator waveguide structure 102. Each of the two electrodes 108a, 108b, is placed at a predetermined distance from the modulator waveguide structure 102. The predetermined distance d between the edge of the electrode to the modulator waveguide structure 102 may be selected to maximize the electric field applied in the EO film 110 (described with respect to FIG. 1B), while minimizing the intensity of the evanescent wave, associated with the guided light, that reaches the electrodes 108a, 108b. A predetermined distance d selected according to these criteria serves to minimize the insertion loss of the integrated optical phase modulator 100.

Figure 1B:
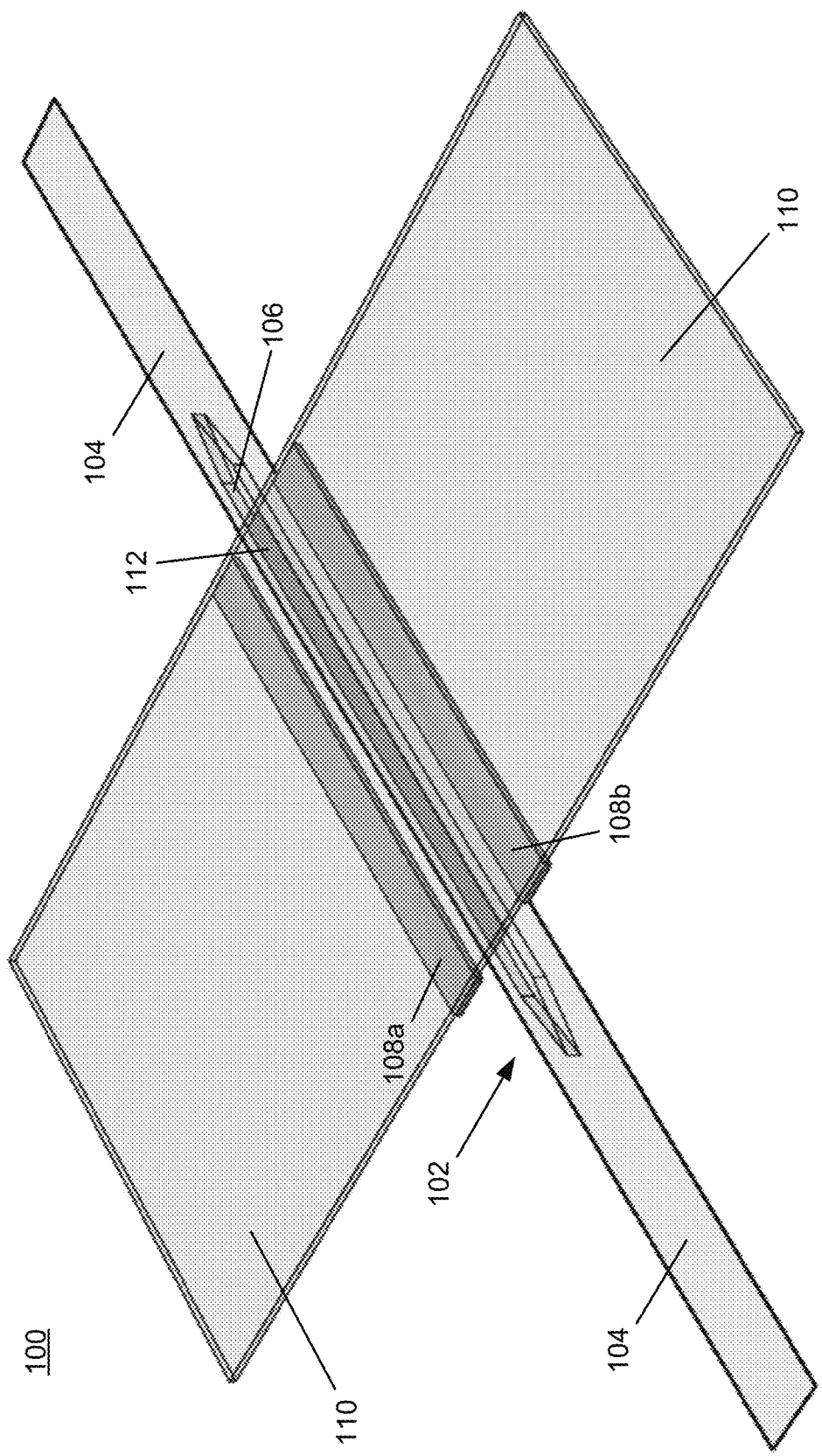
FIG. 1B shows an example embodiment of an integrated optical phase modulator comprising an electrooptic (EO) film to the modulator waveguide structure depicted in FIG. 1A.

FIG. 1B illustrates an example embodiment of an integrated optical phase modulator 100 based on the modulator waveguide structure 102 described in FIG. 1A. In this embodiment, the cladding material above the top surface of the ridge waveguide section 106 of the modulator waveguide structure 102 is removed to expose the top surface of the ridge waveguide section 106. Applying an electrooptic (EO) film 110 to the top side of the modulator waveguide structure 102 results in an integrated phase modulator 100. When the EO film 110 is placed in contact with, or in close proximity to, the upper surface of the ridge waveguide 106, a hybrid single mode waveguide may be formed, where light power is distributed in both the ridge waveguide 106 and the EO film 110, without nodes existing within the hybrid waveguide core that is formed by the combination of the ridge 106 and the EO film 110. A hybrid waveguide can only maintain a single mode by not reaching to the high-order mode cutoff condition, which corresponds to a condition for which the mode ceases to decay exponentially in the waveguide claddings. Either the EO film being too thick, or the refractive index of the EO film being too high, or both, can result in a waveguide guiding high-order modes. A high-order mode waveguide results in a high-loss and low-efficiency device, so the described embodiments avoid implementations that could produce such a high-order mode waveguide.

To ensure that the integrated optical phase modulator 100 exhibits a single-mode field, a thickness of an EO film, which has a known refractive index, can be predetermined according to mode cutoff condition. The maximum thickness of the EO film 110 depends on the refractive index of the EO film 110. The higher the refractive index, the thinner the EO film is required to meet this condition, and the versa visa. In an example embodiment, the ridge waveguide has a height of 0.3 microns and a width of 1 microns, and the waveguide guides a light of wavelength of 830 nm. If the EO film 110 overlaid on the ridge waveguide 106 has a refractive index of 2.3, the maximum thickness of the EO film to maintain a single mode hybrid waveguide is 0.121 microns. If the EO film 110 overlaid on the ridge waveguide 106 has a refractive index of 2.5, the maximum film thickness is 0.078 microns. And, if the EO film 110 has a refractive index of 2.7, the maximum film thickness is 0.069 microns.

Several approaches may be utilized to apply the EO film 110. In an example embodiment, the EO film 110 may be directly deposited on the exposed top surface of the modulator waveguide structure 102, and a cladding material, such as $SiO_2$, may then be deposited on the top of EO film 110.

Alternatively, the EO film 110 may be fabricated separately, such that the EO film 110 is first formed on a substrate that has a lower refractive index than the EO film 110. In an example embodiment, the EO film is a lithium niobate-on-insulator (LNOI). In another example embodiment the EO film is a $PbZr_xTi_{1-x}O_3$ ($x \le 1$) film deposited on a fused silica substrate. The EO film/substrate assembly may be flipped and the EO film of the EO film/substrate assembly bonded to the exposed top surface of the ridge waveguide section 106, with the surface of the EO film 110 in contact with the top surface of the ridge waveguide section 106. In other embodiments, alternative bonding techniques may be used to bond the EO film/substrate assembly to the ridge waveguide section 106, for example by disposing the EO film of the EO film/substrate assembly against the ridge waveguide section 106 and applying pressure to the EO film/substrate assembly at high temperature. In another embodiment, the EO film/substrate assembly may be bonded to the ridge waveguide section 106 by applying and curing an adhesive 112, which has a suitable refractive index, between the surface of the EO film 110 and the surface of the ridge waveguide section 106 (as shown in FIG. 1B).

Figure 2A:
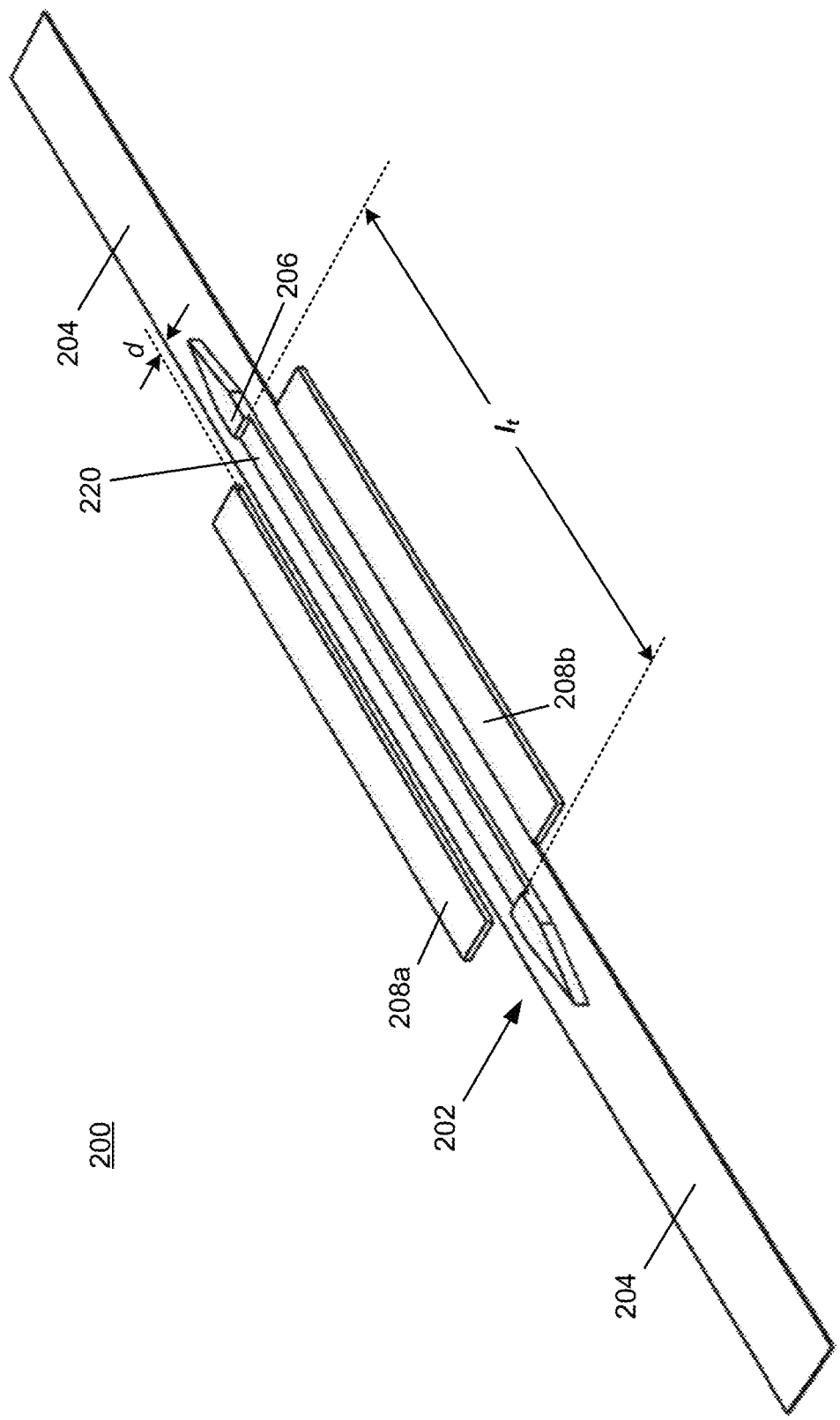
FIG. 2A shows another example embodiment of a modulator waveguide structure of an integrated optical phase modulator, according to the invention.

FIG. 2A shows another example embodiment of the modulator waveguide structure 102 of an integrated optical phase modulator 200. The modulator waveguide structure 202 is formed by fabricating a waveguiding core material into a shape illustrated in the FIG. 2A. The modulator waveguide structure 202 comprises a waveguide core 202 surrounded by a cladding material (not shown for clarity of the illustration) that has a lower refractive index than that of the core materials. In the example embodiment, the core material is silicon mononitride (SiN) and the cladding is silicon dioxide ($SiO_2$), although other core and cladding compositions may alternatively be used.

The modulator waveguide structure comprises a base waveguide core 204 of rectangular cross-section that may be thin and have a high aspect ratio, and a ridge waveguide section 206 with predetermined height and width that is built on the top of the base waveguide core 204. The ridge waveguide section 206 in this embodiment has a trough 220 (of rectangular shape in top view) that is etched into the middle of the ridge. Both ends of the ridge waveguide section 206 are shaped into an in-plane taper, as described with respect to FIG. 1A, to facilitate a low loss transition. The depth of the trough 220 does not exceed the maximum height of the ridge waveguide section 206, and in one example embodiment may be half of the maximum ridge height. The length of the trough 220, which is the distance $l_t$ along lengthwise direction of the modulator waveguide, may be selected to achieve a desired $V_\pi L$ at a particular modulating voltage applied to the electrodes 208a, 208b. The pair of electrodes 208a, 208b, are arranged in parallel with, and on both sides of, the modulator waveguide structure 202. Each of the two electrodes is placed at a predetermined distance to the modulator waveguide structure 202. The predetermined distance d between the edge of the electrode to the modulator waveguide structure 202 may be selected to maximize the electric field applied in the EO film 210 (described with respect to FIG. 2B), while minimizing the intensity of the evanescent wave, associated with the guided light, that reaches the electrodes 208a, 208b. A predetermined distance d selected according to these criteria serves to minimize the insertion loss of the integrated optical phase modulator 200.

Figure 2B:
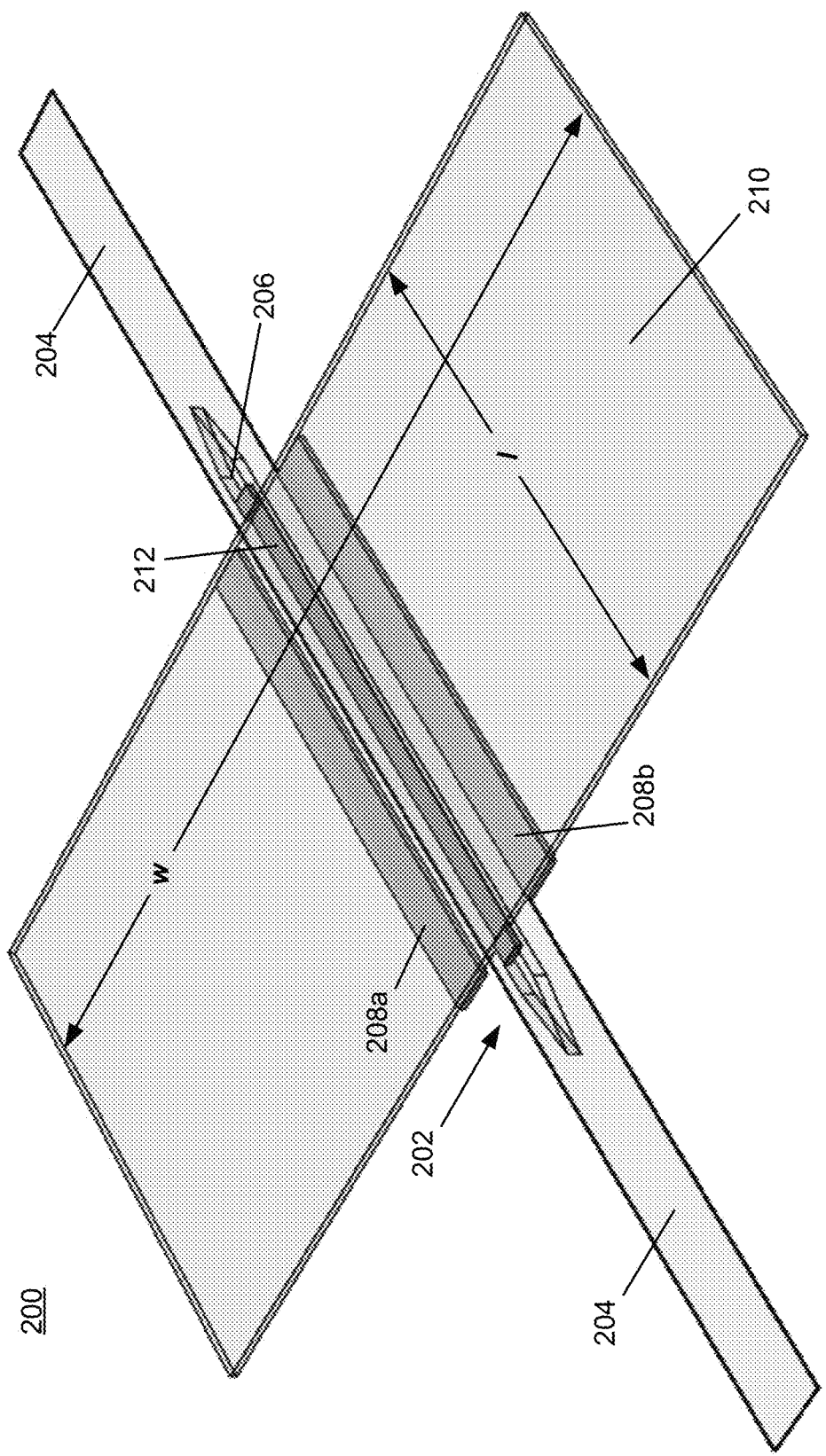
FIG. 2B shows an example embodiment of an integrated optical phase modulator comprising an electrooptic (EO) film to the modulator waveguide structure depicted in FIG. 2A.

FIG. 2B illustrates an example embodiment of an integrated optical phase modulator 200 based on the modulator waveguide structure 202 described in FIG. 2A. In this embodiment, an EO film 210 is disposed on a substrate that has a lower refractive index than the EO film 210, to form a EO film/substrate assembly. The thickness of the EO film 210 may be selected based on its refractive index. The length Z of the EO film 210 is slightly less than the length of the trough 220 etched on the ridge waveguide section 206 as described in FIG. 2A. The tolerance between the length of the trough 220 and the length of the EO film 210 may be determined by, and dependent upon, the accuracy microfabrication processed being employed. The width w of the EO film 210 is greater than the width of the ridge waveguide section 206. The EO film/substrate assembly may be flipped and the EO film of the EO film/substrate assembly bonded to the exposed upper surface of the trough structure. An in-line integrated phase modulator 200 is formed when the EO film 210 is applied to the top side of the modulator waveguide structure 202. Alternative techniques for bonding the EO film/substrate assembly to the modulator waveguide structure 202 may be employed. For example, the bond may be accomplished by disposing the EO film of the EO film/substrate assembly against the ridge waveguide section 206 and applying pressure to the EO film/substrate assembly at high temperature. In another embodiment, the EO film/substrate assembly may be bonded to the ridge waveguide section 206 by applying and curing an adhesive 212, which has a suitable refractive index, between the surface of the EO film 210 and the surface of the ridge waveguide section 206 (as shown in FIG. 2B). The adhesive material can be chosen to have a refractive index between the refractive index of the waveguide core material and that of the EO film 210. In this way, the transition loss between the ridge waveguide section 206 and the hybrid waveguide formed between the troughed ridge structure and the EO film 210 can be substantially reduced.

Figure 3A:
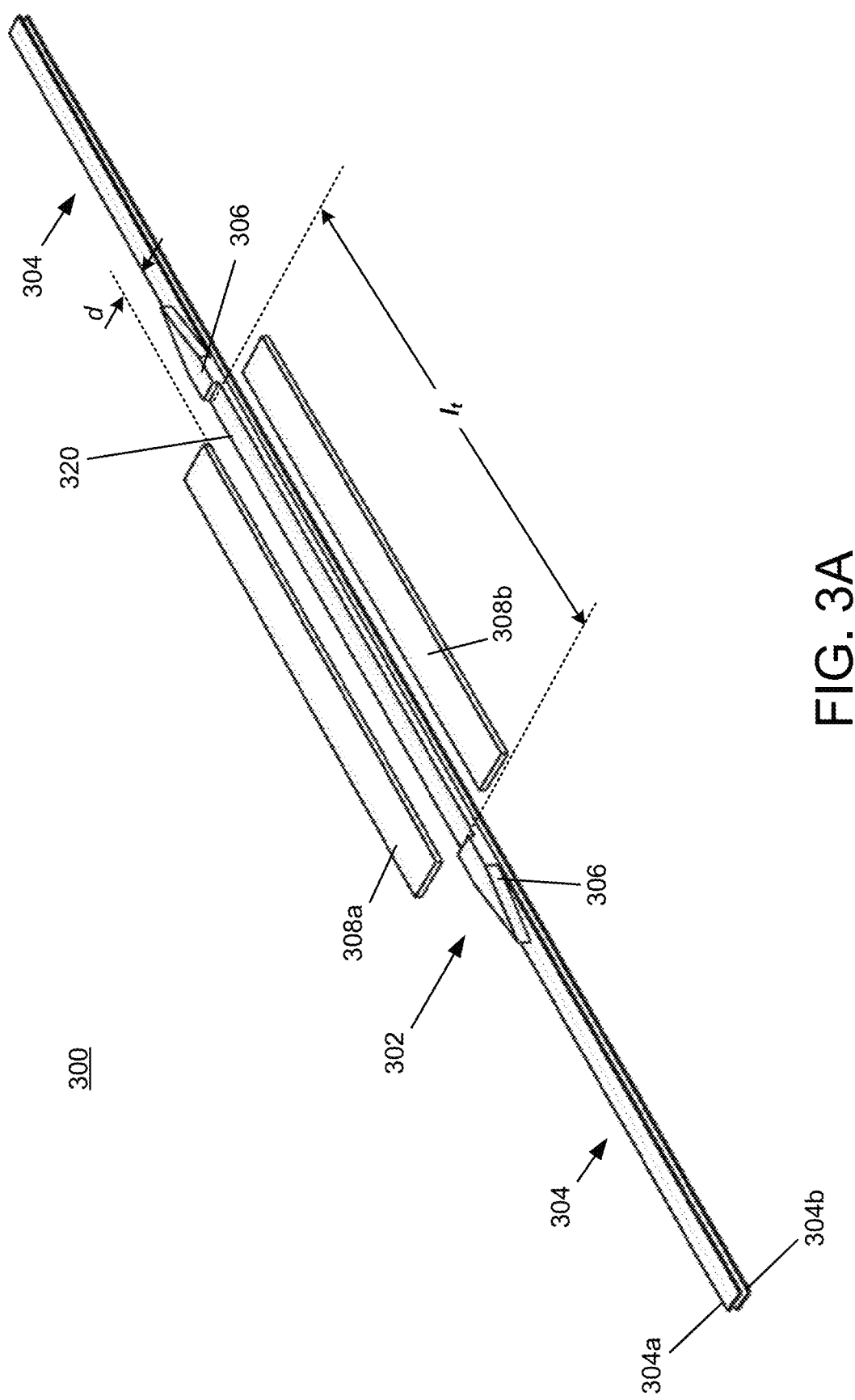
FIG. 3A shows yet another example embodiment of a modulator waveguide structure of an integrated optical phase modulator, according to the invention.

FIG. 3A shows another embodiment of a modulator waveguide structure 302 of an integrated optical phase modulator 300. is formed through fabricating a waveguiding core material into a shape illustrated in the FIG. 3A. The modulator waveguide structure 202 is formed by fabricating a waveguiding core material into a shape illustrated in the FIG. 2A. The modulator waveguide structure 202 comprises a waveguide core 202 surrounded by a cladding material (not shown for clarity of the illustration) that has a lower refractive index than that of the core materials. In the example embodiment, the core material is silicon mononitride (SiN) and the cladding is silicon dioxide ($SiO_2$), although other core and cladding compositions may be used as described herein.

The modulator waveguide structure comprises a base waveguide core 304 having a double strip structure comprising an upper strip 304a and a lower strip 304b. The two strips 304a, 304b, are spaced at a predetermined distance and arranged symmetrically with respect to a vertical axis, and are surrounded by the cladding material. Under this arrangement of the base waveguide core 304, when observed as a cross-section view, two rectangles of core material are immersed in the cladding background and are arranged symmetrically in a column with respect to a vertical axis, and with the longer sides of the two rectangles in paralleled to each other. The two strips have a rectangular cross-section that may be thin and have a high aspect ratio, and a ridge waveguide section 306 of a predetermined height and width that is formed on the top surface of the top strip 304a. The ridge waveguide section 306 a trough 320 (of rectangular shape in top view) that is etched at the middle of the ridge waveguide section 306. Both ends of the ridge waveguide section 306 are shaped into an in-plane taper, as described with respect to FIG. 1A, to facilitate a low loss transition. The depth of the trough 320 does not exceed the maximum height of the ridge waveguide section 306, and in one example embodiment may be half of the maximum ridge height. The length of the trough 320, which is the distance $l_t$ along lengthwise direction of the modulator waveguide, may be selected to achieve a desired $V_\pi L$ at a particular modulating voltage applied to the electrodes 308a, 308b. The pair of electrodes 308a, 308b, are arranged in parallel with, and on both sides of, the modulator waveguide structure 302. Each of the two electrodes is placed at a predetermined distance to the modulator waveguide structure 302. The predetermined distance d between the edge of the electrode to the modulator waveguide structure 302 may be selected to maximize the electric field applied in the EO film 310 (described with respect to FIG. 3B), while minimizing the intensity of the evanescent wave, associated with the guided light, that reaches the electrodes 308a, 308b. A predetermined distance d selected according to these criteria serves to minimize the insertion loss of the integrated optical phase modulator 300.

Figure 3B:
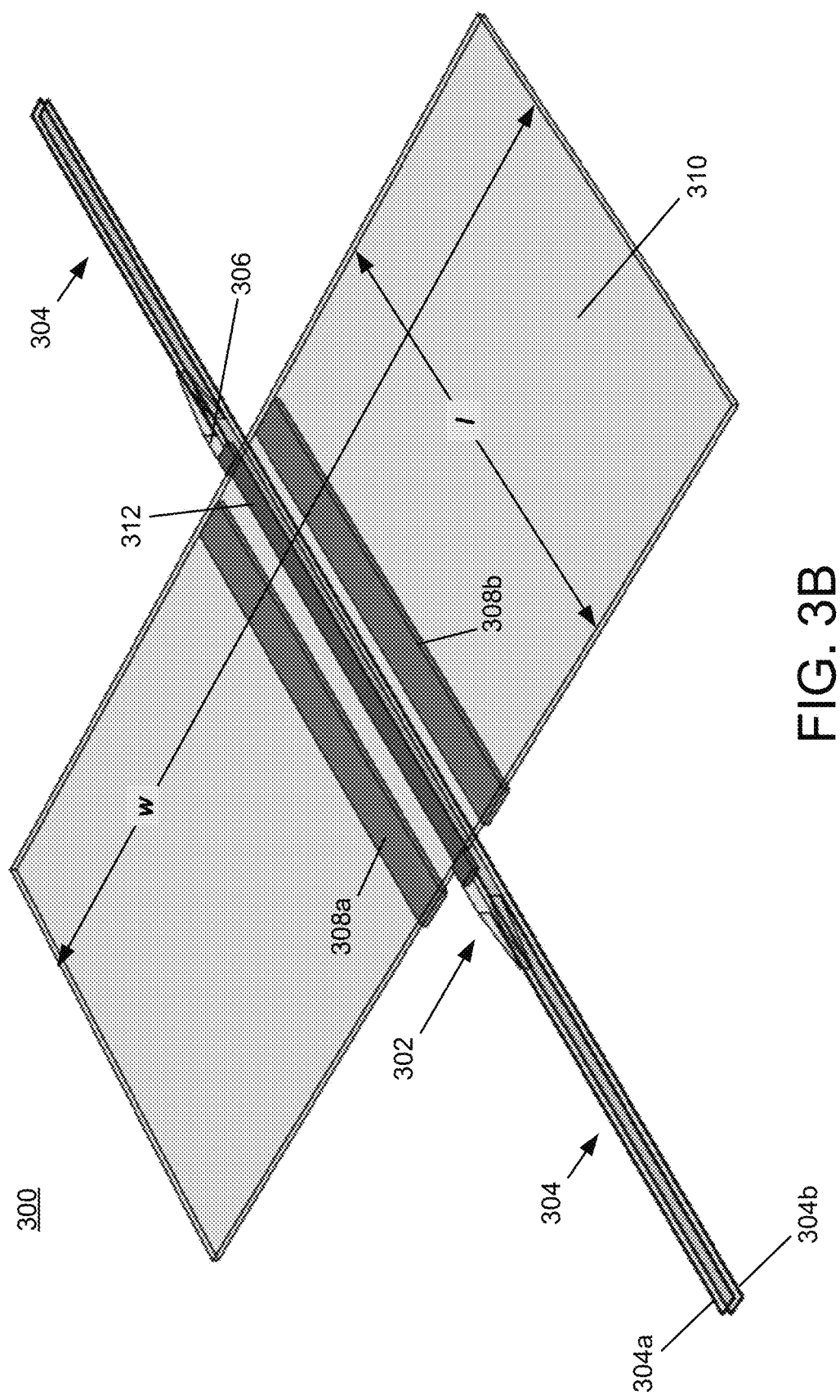
FIG. 3B shows an example embodiment of an integrated optical phase modulator comprising an electrooptic (EO) film to the modulator waveguide structure depicted in FIG. 3A.

FIG. 3B shows an example embodiment of an integrated optical phase modulator 300 based on the modulator waveguide structure 302 described in FIG. 3A. In this embodiment, an EO film 310 is disposed on a substrate that has a lower refractive index than the EO film 310, to form a EO film/substrate assembly. The thickness of the EO film 310 may be selected based on its refractive index. The length Z of the EO film 310 is slightly less than the length of the trough etched on the ridge waveguide section 306 described with respect to FIG. 3A. The tolerance between the length of the trough and the length of the EO film 310 may be determined by, and dependent upon, the accuracy microfabrication processed being employed. The width w of the EO film 310 is greater than the width of the ridge waveguide section 306. The EO film/substrate assembly may be flipped and the EO film of the EO film/substrate assembly bonded to the exposed upper surface of the trough structure. An in-line integrated phase modulator 300 is formed when the EO film 310 is applied to the top side of the modulator waveguide structure 302.

Alternative techniques for bonding the EO film/substrate assembly to the modulator waveguide structure 302 may be employed. For example, the bond may be accomplished by disposing the EO film of the EO film/substrate assembly against the ridge waveguide section 306 and applying pressure to the EO film/substrate assembly at high temperature. In another embodiment, the EO film/substrate assembly may be bonded to the ridge waveguide section 306 by applying and curing an adhesive 312, which has a suitable refractive index, between the surface of the EO film 310 and the surface of the ridge waveguide section 306 (as shown in FIG. 3B). The adhesive material can be chosen to have a refractive index between the refractive index of the waveguide core material and that of the EO film 310. In this way, the transition loss between the ridge waveguide section 306 and the hybrid waveguide formed between the troughed ridge structure and the EO film 310 may be substantially reduced.

Figure 4A:
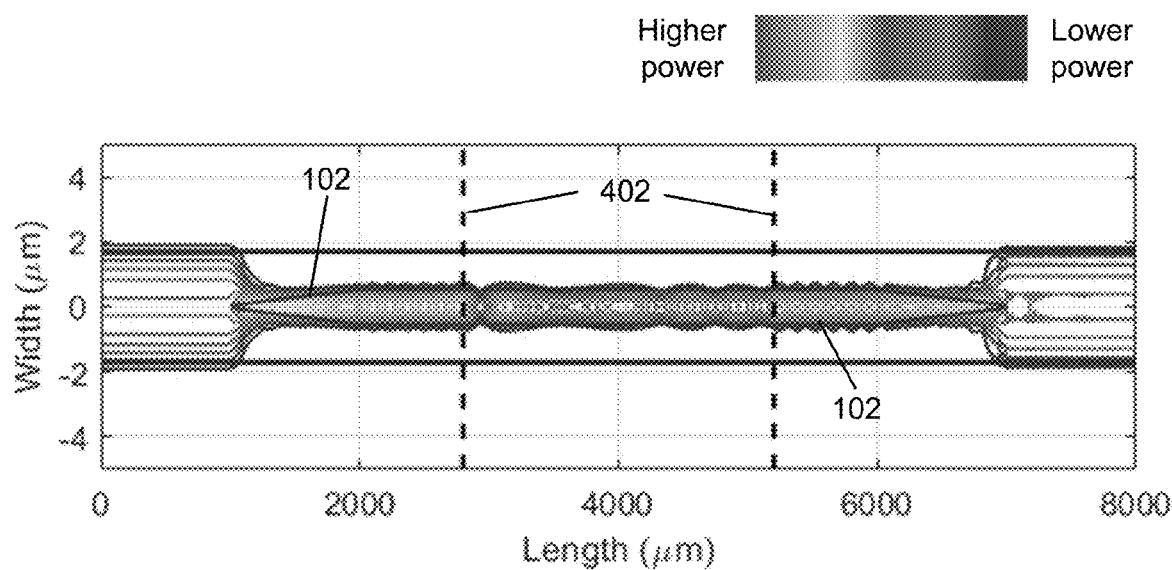
FIG. 4A shows a top-view contour map of the light intensity distribution in the embodiment of the integrated optical phase modulator depicted in FIGS. 1A and 1B.

FIG. 4A shows, in a contour map, the light power distribution as viewed from the top of the integrated optical phase modulator 100 depicted in FIG. 1A. The outlines of the modulator waveguide structure 102, including the base waveguide core 104 and the EO film 110, are superposed on the map. The two broken lines 402 across the waveguide represent the front and rear edges of the overlaid EO film 110. The advantage of the ridge waveguide section 106 in the modulator waveguide structure 102, depicted in FIGS. 1A and 1B, is that the ridge structure substantially reduces the width of the guided mode-field. This allows the pair of modulating electrodes 108a, 108b, to be placed close to the modulator waveguide structure 102 and to each other, so the strength of the electric signal to be increased in the EO material, and consequently the $V_\pi L$ value of the modulator is reduced.

Figure 4B:
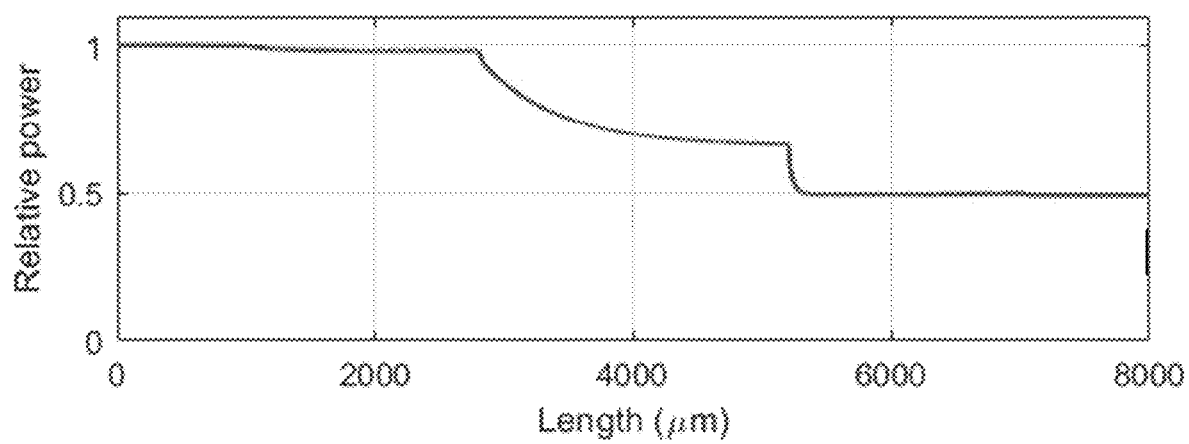
FIG. 4B shows the relative power of the light guided in the integrated optical phase modulator depicted in FIGS. 1A and 1B along the length of the modulator.

FIG. 4B shows the relative power of guided light, normalized to the input power, with respect to position along the lengthwise direction of the integrated optical phase modulator 100 depicted in FIGS. 1A and 1B. The loss is negligible at the two taper transition areas. The major loss is at the front and rear ends of the overlaid EO film. The sudden change in the effective index from the waveguide without and with the overplayed film results in a relatively higher loss. The total insertion loss of this embodiment of the phase modulator is 3 dB.

Figure 5A:
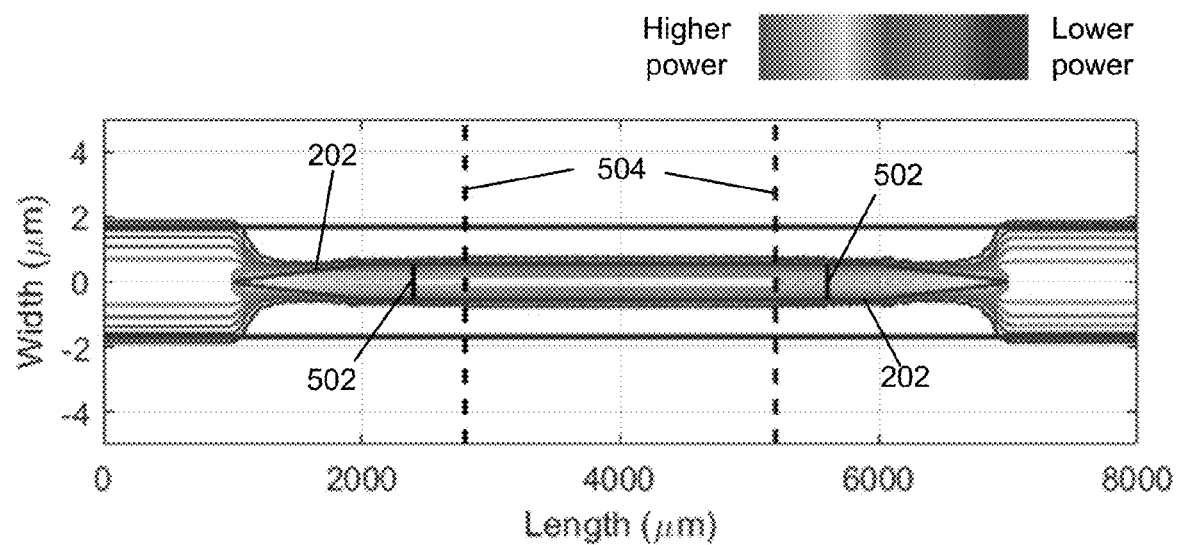
FIG. 5A shows a top view contour map of the light intensity distribution in the embodiment of the integrated optical phase modulator depicted in FIGS. 2A and 2B.

FIG. 5A shows, in a contour map, the light power distribution as viewed from the top of the integrated optical phase modulator 200 depicted in FIG. 2A. The outlines of the modulator waveguide structure 202, including the base waveguide core 204 and the EO film 210, are superposed on the map. The two solid lines 502 across the waveguide outline lines depict the front and rear ends of the trough 220. The two broken lines 504 across the view area of the plot represent the front and rear edges of the overlaid EO film 210. The ridge structure in the embodiment of FIGS. 2A and 2B substantially reduces the width of the guided mode-field. This allows the $V_\pi L$ value of the integrated optical phase modulator 200 to be reduced, as in the embodiment of the integrated optical phase modulator 100 depicted in FIGS. 1A and 1B.

Figure 5B:
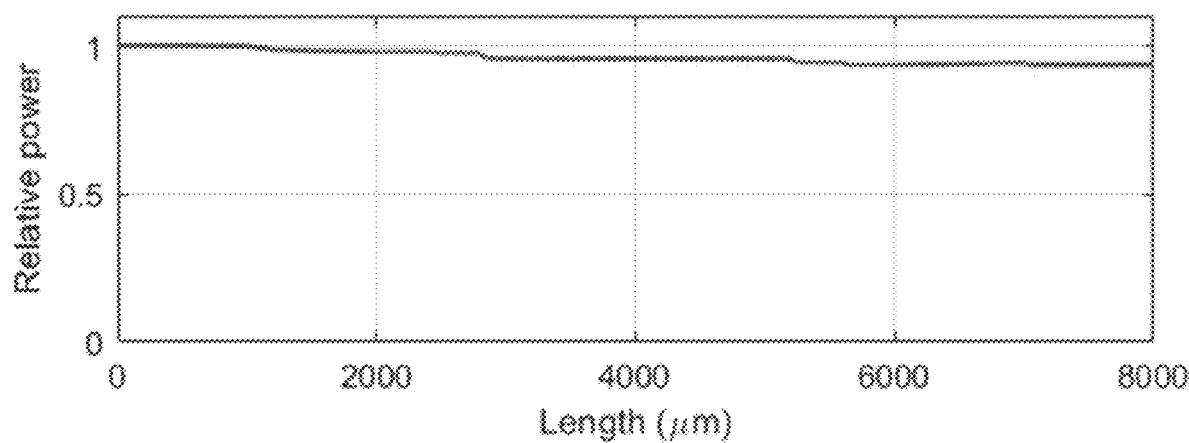
FIG. 5B shows the relative power of the light guided in the integrated optical phase modulator, depicted in FIGS. 2A and 2B, along the length of the modulator.

FIG. 5B shows the relative power of guided light, normalized to the input power, with respect to position along the length of the modulator of the second embodiment. The loss is negligible at the two taper transition areas. The advantage of the embodiment depicted in FIGS. 2A and 2B is that when the adhesive has an optimized refractive index, the loss at the front and rear ends of the overlaying EO film 210 can be dramatically reduced. This is because the adhesive acts as a transition material, such that the effective refractive index changes more gradually, from the ridge waveguide section 206 without the overplayed EO film 210, to the ridge waveguide section 206 with film. The total insertion loss of this embodiment of the phase modulator is less than 0.3 dB.

Figure 6A:
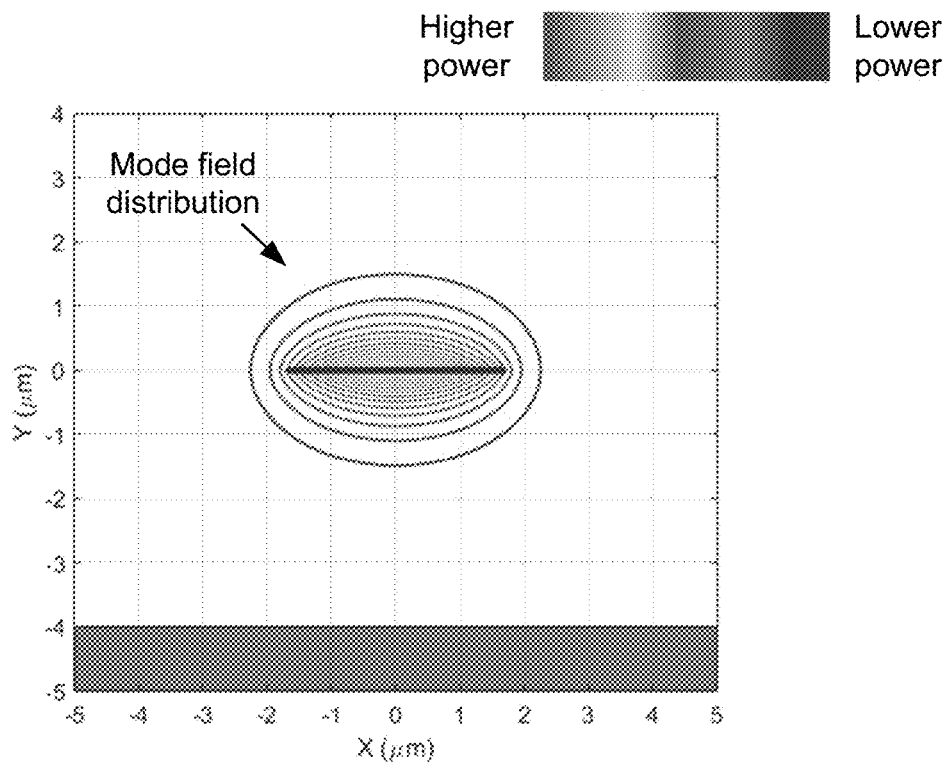
FIG. 6A shows a cross-section view contour map, for the embodiment of the integrated optical phase modulator depicted in FIGS. 2A and 2B, of the light intensity distribution (mode field) at the thin strip base waveguide, away from the ridge waveguide section.
Figure 6B:
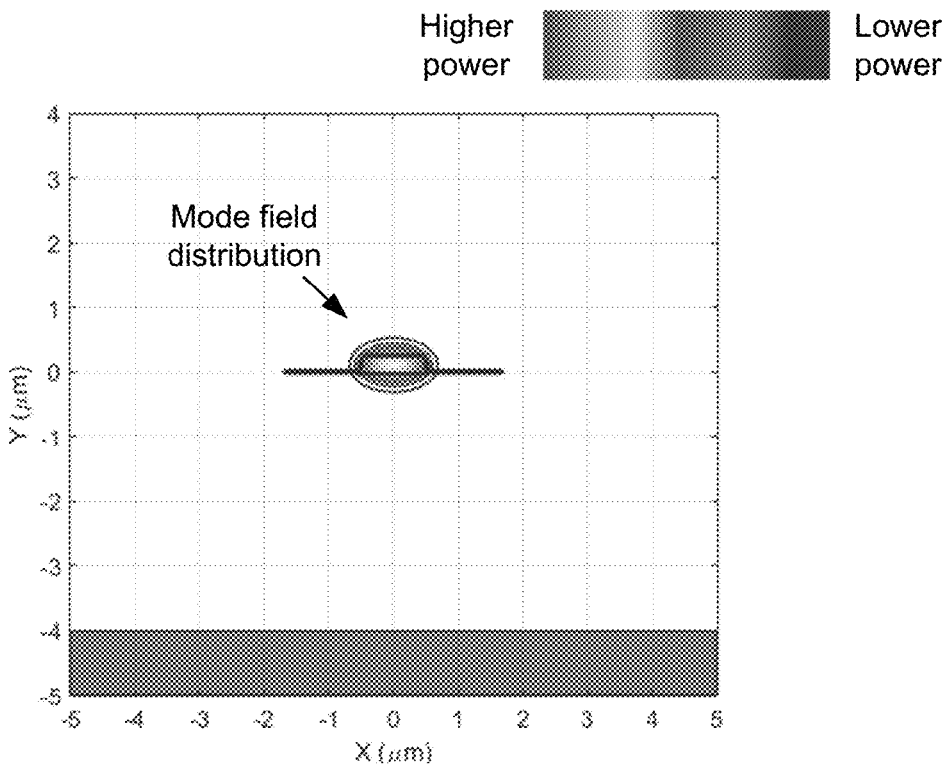
FIG. 6B shows a cross-section view contour map, for the embodiment of the integrated optical phase modulator depicted in FIGS. 2A and 2B, of the light intensity distribution (mode field) at the modulator waveguide structure, i.e., at the ridge waveguide section on top of the thin strip base waveguide, and in the absence of the EO film.
Figure 6C:
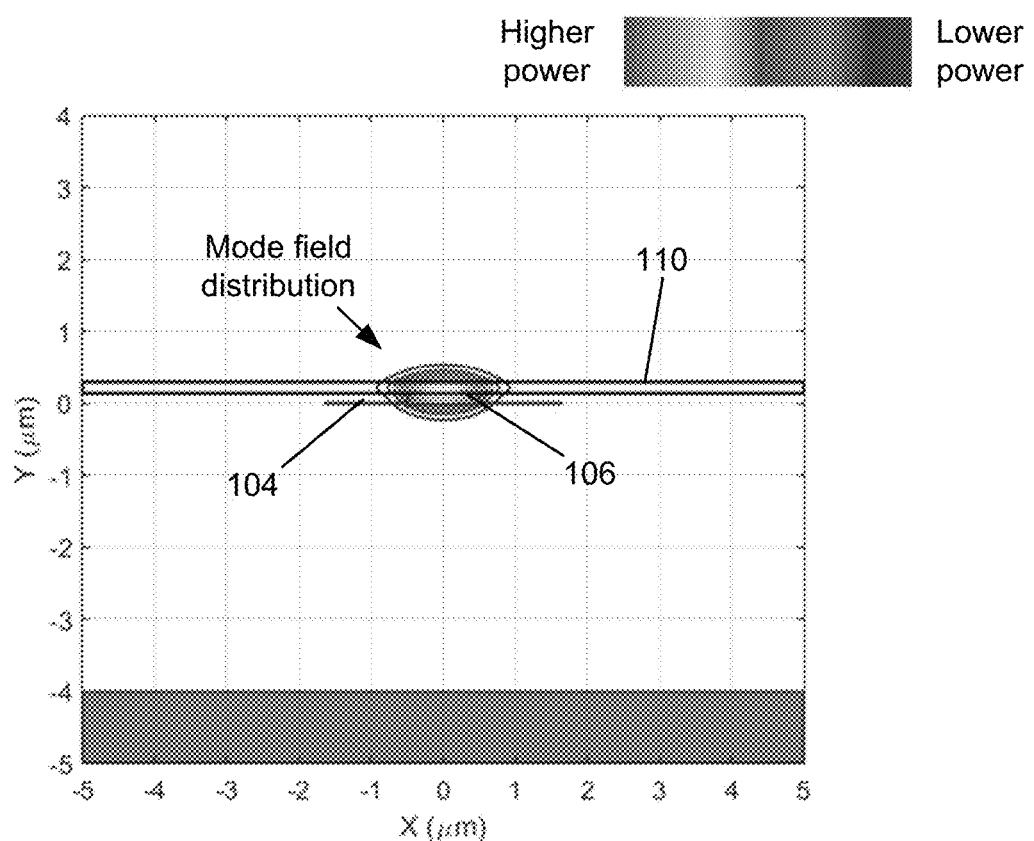
FIG. 6C shows a cross-section view contour map, for the embodiment of the integrated optical phase modulator depicted in FIGS. 2A and 2B, of the light intensity distribution (mode field) at the integrated phase modulator, where the thin EO film is bonded onto the top surface of the ridge waveguide section.

FIGS. 6A, 6B and 6C illustrate example mode-field distributions of the guided light at three different locations of the modulator depicted in FIGS. 1A and 1B. FIG. 6A shows the mode-field distribution at the thin strip base waveguide 104, away from the ridge waveguide section 106. FIG. 6B shows the mode-field distribution at the modulator waveguide structure 102, i.e., at the ridge waveguide section 106 on top of the thin strip base waveguide 104, and in the absence of the EO film. FIG. 6C shows the mode-field distribution at the integrated phase modulator 100, where the thin EO film is bonded onto the top surface of the ridge waveguide section 106. The size of the mode field at the waveguide section with the ridge structure is substantially reduced, as shown in FIG. 6B and FIG. 6C, in comparison to the mode field size at the thin and high-aspect base waveguide without the ridge waveguide section 106 or EO film, as shown in FIG. 6A.

Figure 7A:
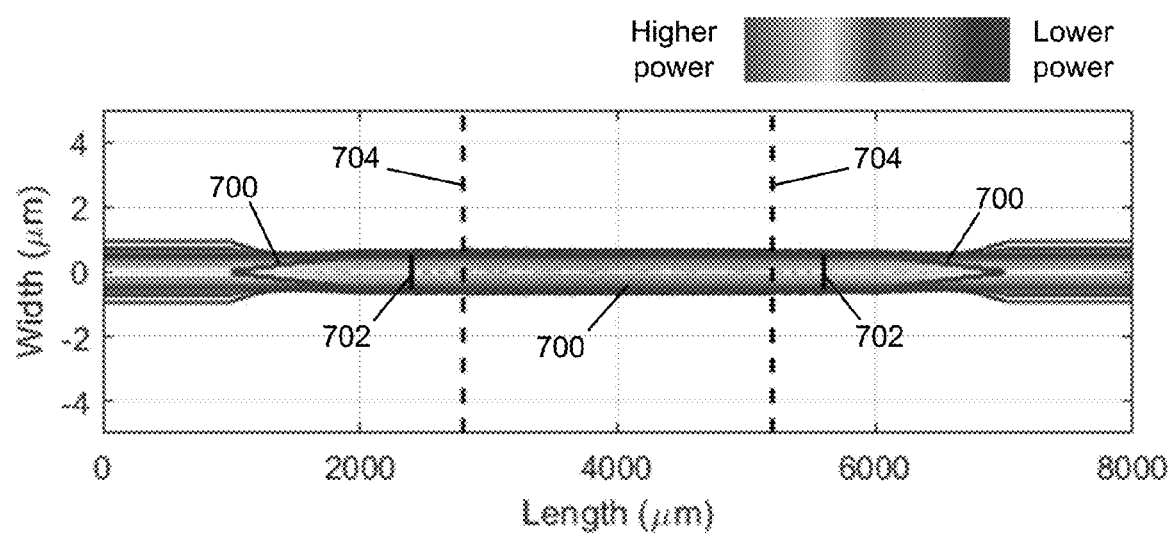
FIG. 7A shows a top view contour map of the light intensity distribution in the embodiment of the integrated optical phase modulator depicted in FIGS. 3A and 3B.

FIG. 7A shows the contour map of the light power distribution, viewed from the top of the phase modulator of the example embodiment depicted in FIG. 3A (this embodiment's base waveguide core has a double strip configuration). The outline 700 of the modulator waveguide structure, including the waveguide core and the EO film, are superposed in the map. The two solid lines 702 across the waveguide outline depict the front and rear ends of the trough 320. The two broken lines 704 across the view area of the plot represent the front and rear edges of the overlaid EO film. As with the embodiment depicted in FIGS. 6A through 6C, the ridge waveguide section 306 of this embodiment substantially reduces the width of the guided mode-field, which allows the $V_\pi L$ value of the modulator to be further reduced.

Figure 7B:
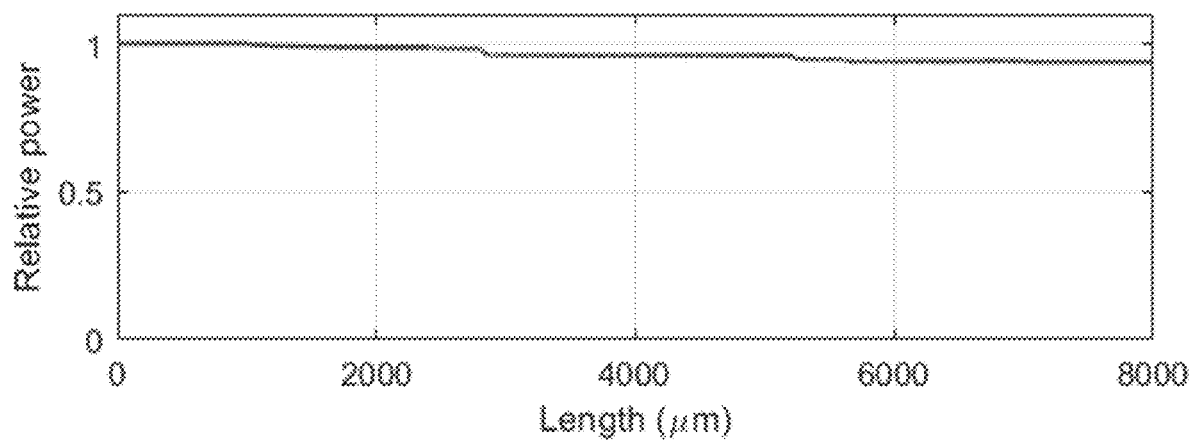
FIG. 7B shows the relative power of the light guided in the integrated optical phase modulator depicted in FIGS. 3A and 3B, along the length of the modulator.

FIG. 7B shows the relative power of guided light, normalized to the input power, at the different position along the length of the modulator waveguide structure 302. The loss is negligible at the two taper transition areas. An advantage of the example embodiment of the modulator waveguide structure 302 is that when the EO film adhesive has an optimized refractive index, the losses at the front and rear ends of the overlaying EO film are small because the adhesive acts also as a transition material, so that the effective refractive index more gradually changes from the portion of the ridge waveguide section that is not overlayed with EO film, to the portion of the ridge waveguide section that is overlayed with EO film. The total insertion loss of this example embodiment of the modulator waveguide structure 302 is less than 0.3 dB.

Figure 8A:
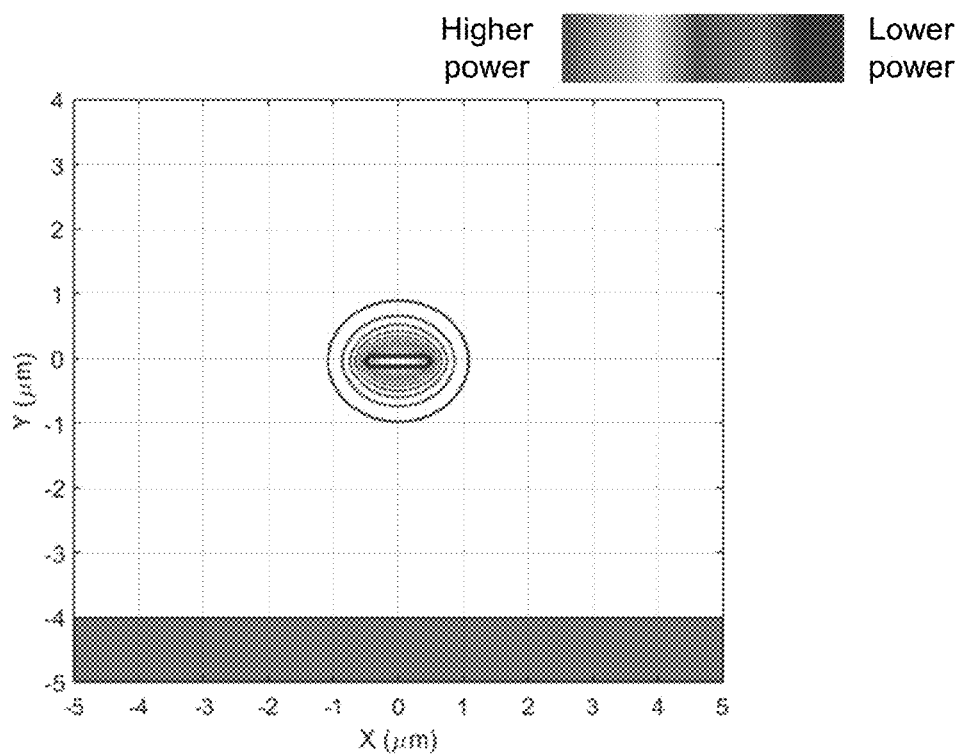
FIG. 8A shows a cross-section view contour map, for the embodiment of the integrated optical phase modulator depicted in FIGS. 3A and 3B, of the light intensity distribution (mode field) at the thin strip base waveguide, away from the ridge waveguide section.
Figure 8B:
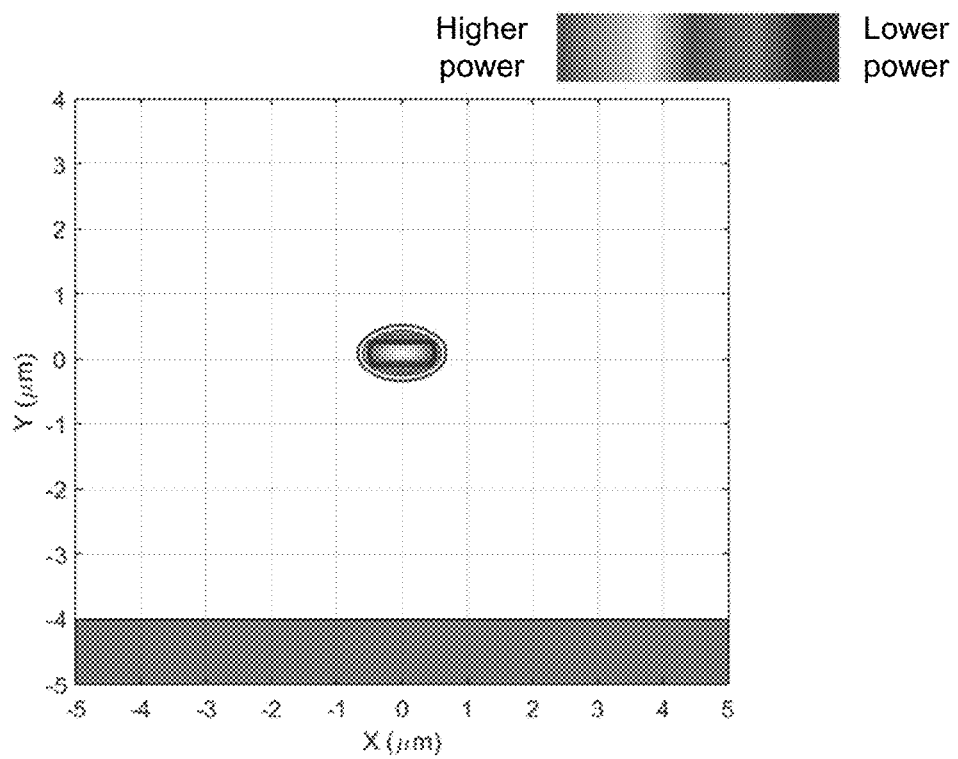
FIG. 8B shows a cross-section view contour map, for the embodiment of the integrated optical phase modulator depicted in FIGS. 3A and 3B, of the light intensity distribution (mode field) at the modulator waveguide structure, i.e., at the ridge waveguide section on top of the thin strip base waveguide, and in the absence of the EO film.
Figure 8C:
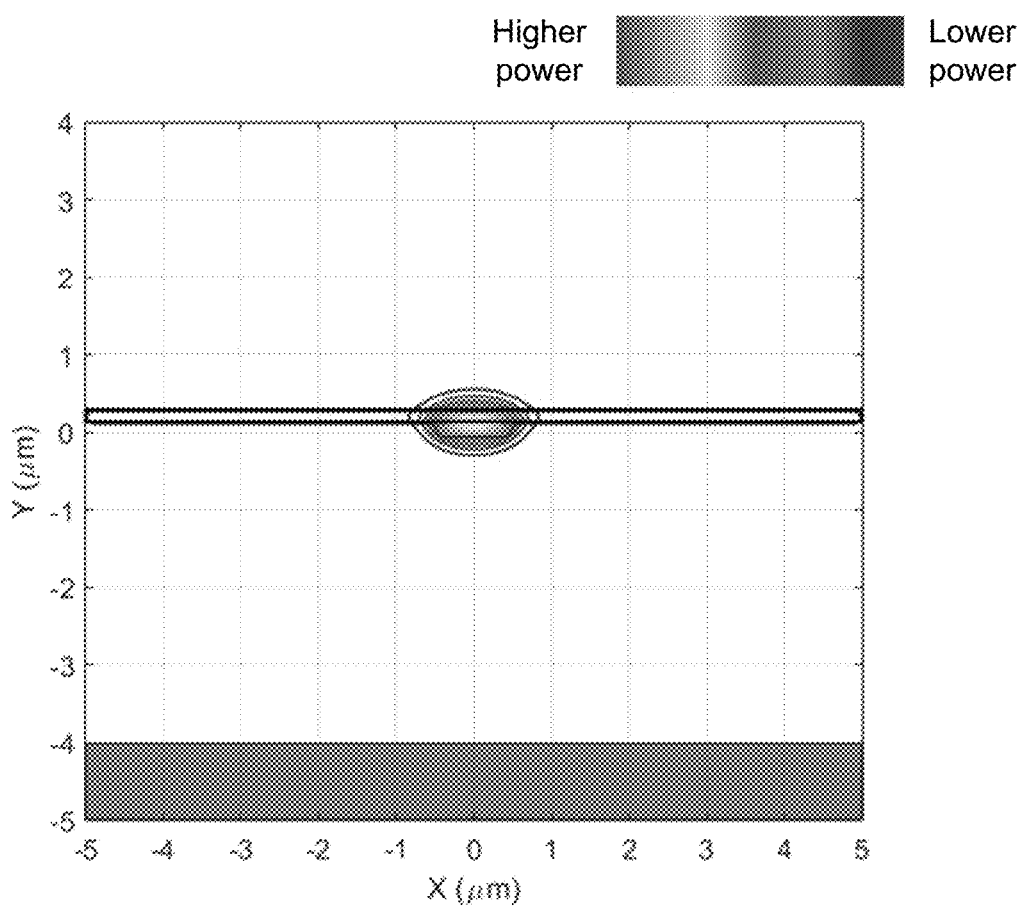
FIG. 8C shows a cross-section view contour map, for the embodiment of the integrated optical phase modulator depicted in FIGS. 3A and 3B, of the light intensity distribution (mode field) at the integrated phase modulator, where the thin EO film is bonded onto the top surface of the ridge waveguide section.

FIGS. 8A, 8B and 8C show the mode-field distributions of the guided light at three different locations in the example embodiment of the modulator waveguide structure 302 depicted in FIGS. 3A and 3B. FIG. 8A shows the mode-field distribution at the double strip base waveguide 304, away from the ridge waveguide section 306. FIG. 8B shows the mode-field distribution in the vicinity of the modulator waveguide structure 302, i.e., at the ridge waveguide section 306 on top of the thin strip base waveguide 304, and in the absence of the EO film. FIG. 8C shows the mode-field distribution at the integrated phase modulator 300, where the thin EO film is bonded onto the top surface of the ridge waveguide section 306. The size of the mode field at the waveguide section with the ridge structure is substantially reduced, as shown in FIG. 8B and FIG. 8C, in comparison to the mode field size at the thin and high-aspect base waveguide without the ridge waveguide section 106 or EO film, as shown in FIG. 8A.

Figure 9:
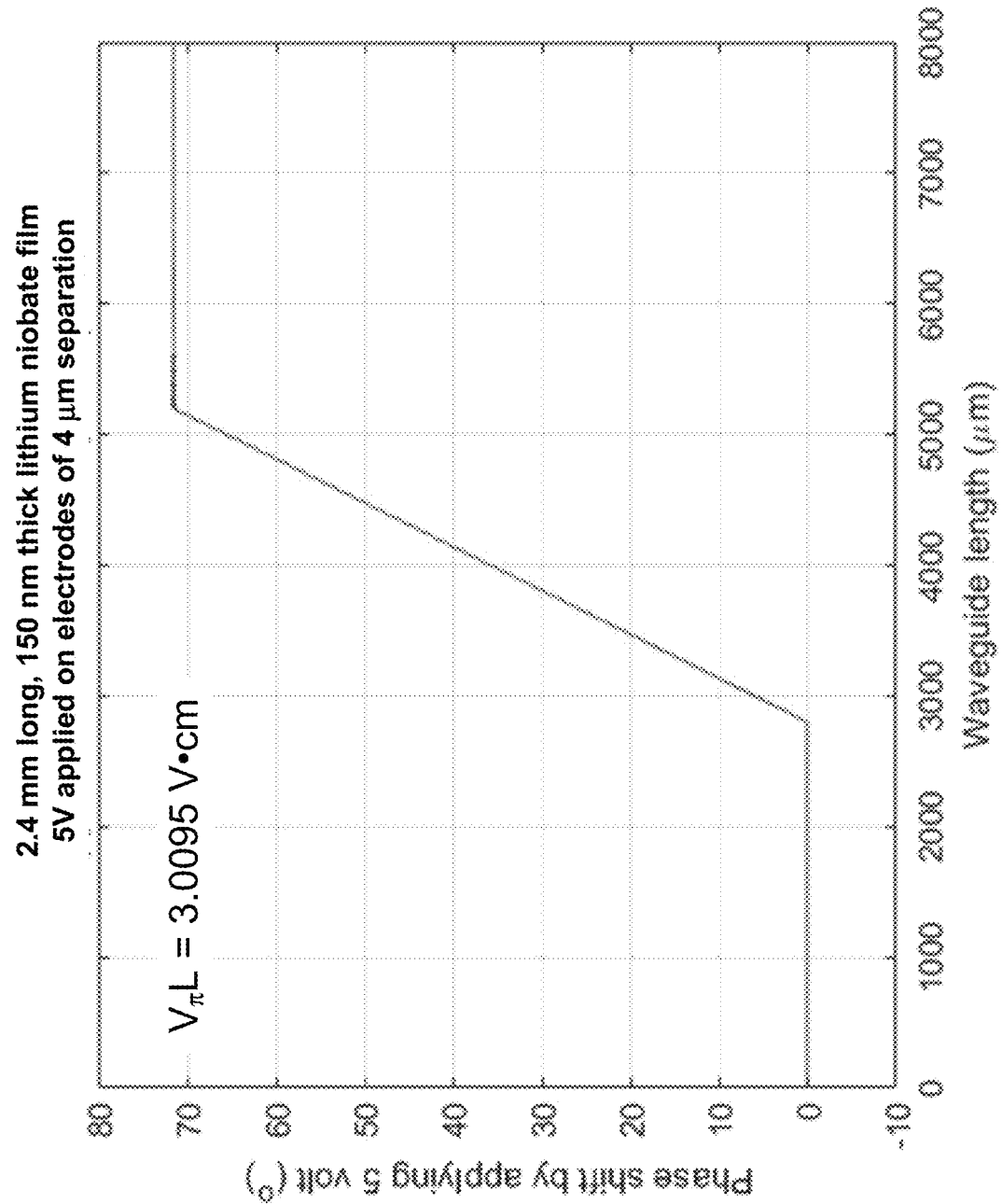
FIG. 9 shows an example of the phase shift, in the lengthwise direction across the integrated phase modulator depicted in FIGS. 3A and 3B, with five volts applied across the two electrodes.

FIG. 9 shows an example of the phase shift, in the lengthwise direction across the integrated phase modulator 300 depicted in FIGS. 3A and 3B, with five (5) volts applied across the two electrodes 308a, 308b. This phase shift plot is with respect to the phase of the integrated phase modulator 300 with the two electrodes 308a, 308b, at the same voltage potential. The phase shift caused by the applied voltage increases linearly along the modulator's lengthwise direction, within the modulator waveguide structure 302 where the modulator waveguide structure 302 is covered with the EO film. The $V_\pi L$ value of this example embodiment is 3.0095 V·cm.

Figure 10A:
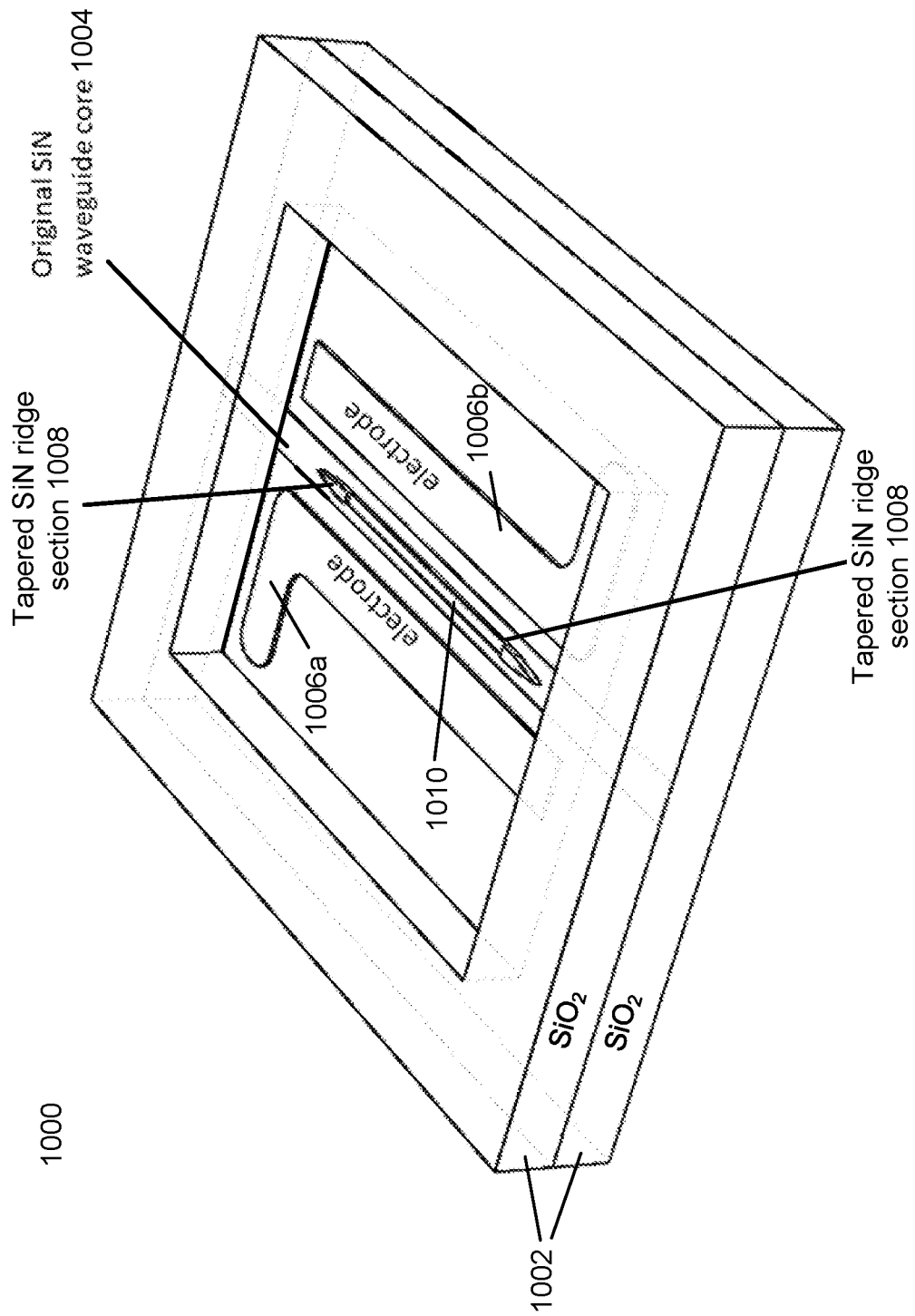
FIG. 10A shows an example fabrication and assembly of the embodiment of the modulator waveguide structure depicted in FIGS. 2A and 2B.

FIG. 10A shows an example embodiment 1000 of the modulator waveguide structure 202 depicted in FIGS. 2A and 2B, which may be implemented using a standard complementary-metal-oxide semiconductor (CMOS) microfabrication process known in the art. For this example embodiment 1000, the waveguide cladding material 1002 may be silicon dioxide ($SiO_2$), the waveguide core 1004 may be silicon nitride (SiN), and electrodes 1006a, 1006b, may be gold (Au).

Figure 10B:
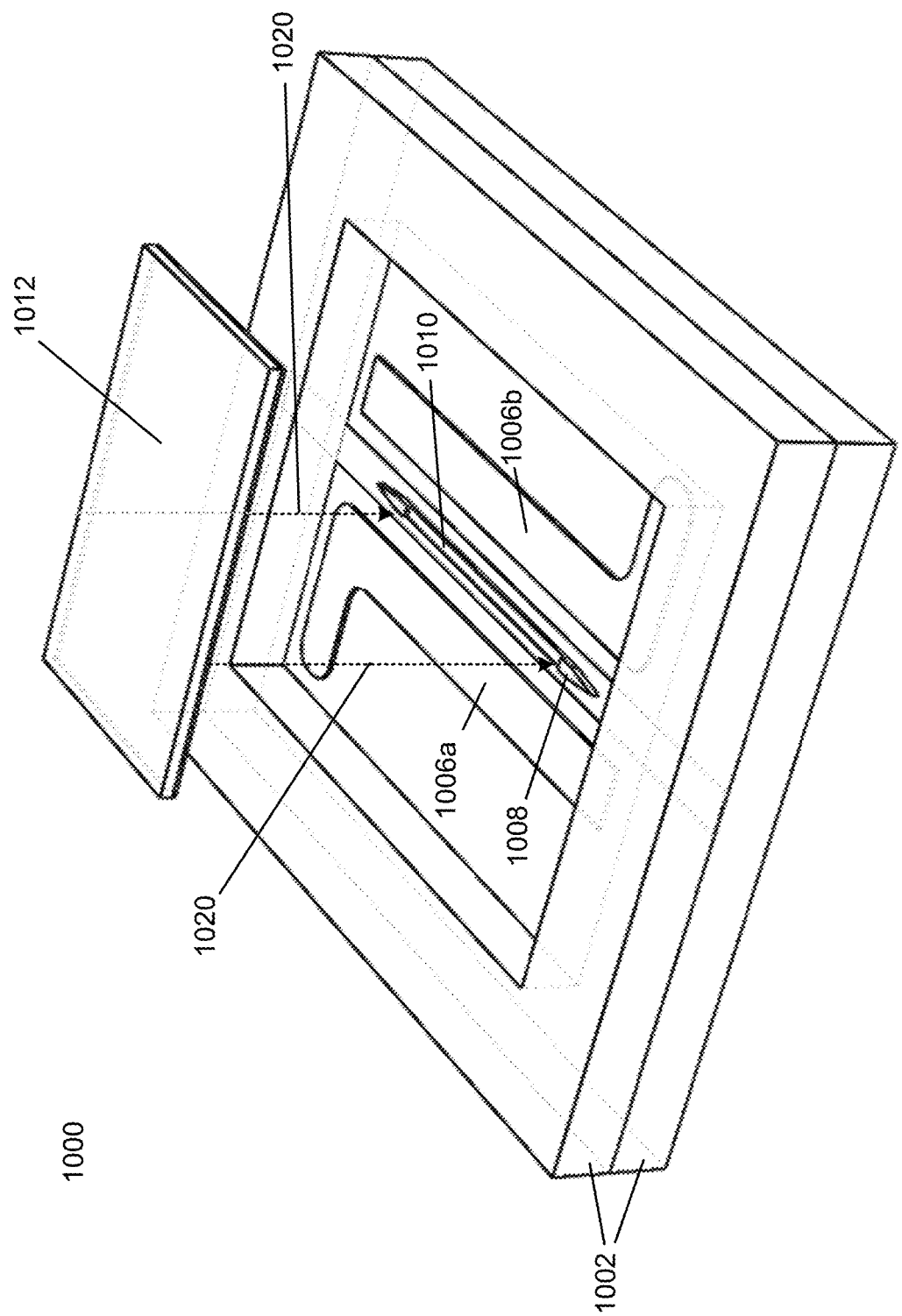
FIG. 10B is an example of formation of a hybrid modulator based on the modulator waveguide structure depicted in FIGS. 2A and 2B.

FIG. 10B shows an example embodiment of an inline integrated optical phase modulator, as described herein, that may be implemented by placing a thin EO film 1012 on the bottom surface of the trough 1010 formed within the ridge waveguide section 1008 (as indicated by dashed arrows 1020). The EO film 1012 may have a predetermined thickness that is based on the refractive index of the EO film. The EO film 1012 may have a length that is slightly less than the length of the trough 1010 etched on the ridge waveguide section 1008. Further, the EO film 1012 may be directly deposited on the exposed top surface of the ridge waveguide section 1008. Alternatively, the EO film 1012 may be formed separately on a substrate with a lower refractive index, as described herein, and flipped and disposed in the trough 1010 within the ridge waveguide section 1008.

While example embodiments have been particularly shown and described, it will be understood by those skilled in the art that various changes in form and details may be made therein without departing from the scope of the embodiments encompassed by the appended claims.

What is claimed is:

1. An integrated optical phase modulator comprising:
a photonic integrated circuit (PIC) configured as a modulator waveguide structure, the modulator waveguide structure comprising:
   a base waveguide core having a rectangular cross-section with a width-to-height ratio of greater than or equal to 10;
   a ridge disposed on the base waveguide core, the ridge having a first end and a second end, each of which is shaped into a width-wise taper, the ridge having a top surface that is coplanar with an upper surface of the modulator wave guide structure; and
   a cladding disposed beneath and on each side of the modulator waveguide structure;
a first electrode and a second electrode disposed on the upper surface of the modulator waveguide structure, the first electrode and the second electrode being coplanar with the base waveguide core and disposed on opposing sides of the base waveguide core at a predetermined distance from the base waveguide core; and
an electrooptic film characterized by a refractive index that changes in response to an electric field applied to the electrooptic film, the electrooptic film disposed on the upper surface of the modulator waveguide structure and overlaying the base waveguide core, the ridge, the first electrode, and the second electrode.

2. The integrated optical phase modulator of claim 1, wherein the base waveguide core comprises silicon nitride (SiN), and the cladding comprises silicon dioxide ($SiO_2$).

3. The integrated optical phase modulator of claim 1, wherein each of the width-wise tapers has a predetermined taper slope, and the width wise taper slope at the first end of the ridge is the same as the predetermined taper slope at the second end of the ridge.

4. The integrated optical phase modulator of claim 1, wherein the electrooptic film has a higher refractive index than a refractive index of the base waveguide core.

5. The integrated optical phase modulator of claim 1, wherein the electrooptic film comprises lithium niobate ($LiNbO_3$).

6. The integrated optical phase modulator of claim 1, wherein the electrooptic film comprises a ferroelectric material selected from $PbTiO_3$, $BaTiO_3$, $PbZr_xTi_{1-x}O_3$, $SrTiO_3$, $Pb_xSr_{1-x}TiO_3$, and $Pb_xLa_{1-x}Zr_yTi_{1-y}O_3$, where x≤1 and y≤1.

7. The integrated optical phase modulator of claim 1, wherein the electrooptic film comprises one or both of (i) polymeric electrooptic material and (ii) organic electrooptic material.

8. An integrated optical phase modulator comprising:
a photonic integrated circuit (PIC) configured as a modulator waveguide structure, the modulator waveguide structure comprising:
   a base waveguide core having a rectangular cross-section with a width-to-height ratio of greater than or equal to 10;
   a ridge disposed on the base waveguide core, the ridge having a first end and a second end, each of which is shaped into a width-wise taper, the ridge having a top surface that is coplanar with an upper surface of the modulator wave guide structure;
   a trough formed in the top surface of the ridge in a lengthwise direction of the base waveguide core, the trough having a length less than a length of the ridge, and a height not exceeding a height of the ridge; and
   a cladding disposed beneath and on each side of the modulator waveguide structure;
a first electrode and a second electrode disposed on the upper surface of the modulator waveguide structure, the first electrode and the second electrode being coplanar with the base waveguide core and disposed on opposing sides of the base waveguide core at a predetermined distance from the base waveguide core; and
an electrooptic film characterized by a refractive index that changes in response to an electric field applied to the electrooptic film, the electrooptic film disposed on a substrate that has a lower refractive index than that of the electrooptic film, the electrooptic film arranged such that a surface of the electrooptic film is in contact with a surface of the trough and overlaying the base waveguide core, the ridge, the first electrode, and the second electrode.

9. The integrated optical phase modulator of claim 8, wherein the electrooptic film has a thickness the same as the trough height, a length shorter than the trough length, and a width greater than a width of the ridge.

10. The integrated optical phase modulator of claim 8, wherein the base waveguide core comprises silicon nitride (SiN), and the cladding comprises silicon dioxide ($SiO_2$).

11. The integrated optical phase modulator of claim 8, wherein each of the width-wise tapers has a predetermined taper slope, and the width wise taper slope at the first end of the ridge is the same as the predetermined taper slope at the second end of the ridge.

12. The integrated optical phase modulator of claim 8, wherein the electrooptic film has a higher refractive index than a refractive index of the base waveguide core.

13. The integrated optical phase modulator of claim 8, wherein the electrooptic film comprises lithium niobate ($LiNbO_3$).

14. The integrated optical phase modulator of claim 8, wherein the electrooptic film comprises a ferroelectric material selected from $PbTiO_3$, $BaTiO_3$, $PbZr_xTi_{1-x}O_3$, $SrTiO_3$, $Pb_xSr_{1-x}TiO_3$, and $Pb_xLa_{1-x}Zr_yTi_{1-y}O_3$, where x≤1 and y≤1.

15. The integrated optical phase modulator of claim 8, wherein the electrooptic film comprises one or both of (i) polymeric electrooptic material and (ii) organic electrooptic material.

16. The integrated optical phase modulator of claim 8, wherein the surface of the electrooptic film is bonded to the surface of the trough with an adhesive.

17. An integrated optical phase modulator comprising:
a photonic integrated circuit (PIC) configured as a modulator waveguide structure, the modulator waveguide structure comprising:
   a base waveguide core having an upper strip and a lower strip spaced in a vertical direction by a predetermined distance and placed symmetrically with respect to a vertical axis, each of the upper strip and the lower strip having a rectangular cross-section with a width-to-height ratio of greater than or equal to 10;
   a ridge disposed on the upper strip of the base waveguide core, the ridge having a first end and a second end, each of which is shaped into a width-wise taper, the ridge having a top surface that is coplanar with an upper surface of the modulator wave guide structure;
   a cladding disposed beneath and on each side of the modulator waveguide structure;

a first electrode and a second electrode disposed on the upper surface of the modulator waveguide structure, the first electrode and the second electrode being coplanar with the base waveguide core and disposed on opposing sides of the base waveguide core at a predetermined distance from the base waveguide core; and an electrooptic film characterized by a refractive index that changes in response to an electric field applied to the electrooptic film, the electrooptic film disposed on the upper surface of the modulator waveguide structure and overlaying the base waveguide core, the ridge, the first electrode, and the second electrode.

18. The integrated optical phase modulator of claim 17, wherein the base waveguide core comprises silicon nitride (SiN), and the cladding comprises silicon dioxide ($SiO_2$).

19. The integrated optical phase modulator of claim 17, wherein each of the width-wise tapers has a predetermined taper slope, and the width wise taper slope at the first end of the ridge is the same as the predetermined taper slope at the second end of the ridge.

20. The integrated optical phase modulator of claim 17, wherein the electrooptic film has a higher refractive index than a refractive index of the base waveguide core.

21. The integrated optical phase modulator of claim 17, wherein the electrooptic film comprises lithium niobate ($LiNbO_3$).

22. The integrated optical phase modulator of claim 17, wherein the electrooptic film comprises a ferroelectric material selected from $PbTiO_3$, $BaTiO_3$, $PbZr_xTi_{1-x}O_3$, $SrTiO_3$, $Pb_xSr_{1-x}TiO_3$, and $Pb_xLa_{1-x}Zr_yTi_{1-y}O_3$, where $x \leq 1$ and $y \leq 1$.

23. The integrated optical phase modulator of claim 17, wherein the electrooptic film comprises one or both of (i) polymeric electrooptic material and (ii) organic electrooptic material.

24. An integrated optical phase modulator comprising:
a photonic integrated circuit (PIC) configured as a modulator waveguide structure, the modulator waveguide structure comprising:
  a base waveguide core having a rectangular cross-section with a width-to-height ratio of greater than or equal to 10;
  a ridge disposed on the base waveguide core, the ridge having a first end and a second end, each of which is shaped into a width-wise taper, the ridge having a top surface that is coplanar with an upper surface of the modulator wave guide structure;
  a trough formed in the top surface of the ridge in a lengthwise direction of the base waveguide core, the trough having a length less than a length of the ridge, and a height not exceeding a height of the ridge; and
  a cladding disposed beneath and on each side of the modulator waveguide structure;
a first electrode and a second electrode disposed on the upper surface of the modulator waveguide structure, the first electrode and the second electrode being coplanar with the base waveguide core and disposed on opposing sides of the base waveguide core at a predetermined distance from the base waveguide core; and
an electrooptic film characterized by a refractive index that changes in response to an electric field applied to the electrooptic film, the electrooptic film disposed on a substrate that has a lower refractive index than that of the electrooptic film, the electrooptic film arranged such that a surface of the electrooptic film is in contact with a surface of the trough and overlaying the base waveguide core, the ridge, the first electrode, and the second electrode.

25. The integrated optical phase modulator of claim 24, wherein the base waveguide core comprises silicon nitride (SiN), and the cladding comprises silicon dioxide ($SiO_2$).

26. The integrated optical phase modulator of claim 24, wherein each of the width-wise tapers has a predetermined taper slope, and the width wise taper slope at the first end of the ridge is the same as the predetermined taper slope at the second end of the ridge.

27. The integrated optical phase modulator of claim 24, wherein the electrooptic film has a higher refractive index than a refractive index of the base waveguide core.

28. The integrated optical phase modulator of claim 24, wherein the electrooptic film comprises lithium niobate ($LiNbO_3$).

29. The integrated optical phase modulator of claim 24, wherein the electrooptic film comprises a ferroelectric material selected from $PbTiO_3$, $BaTiO_3$, $PbZr_xTi_{1-x}O_3$, $SrTiO_3$, $Pb_xSr_{1-x}TiO_3$, and $Pb_xLa_{1-x}Zr_yTi_{1-y}O_3$, where $x \leq 1$ and $y \leq 1$.

30. The integrated optical phase modulator of claim 24, wherein the electrooptic film comprises one or both of (i) polymeric electrooptic material and (ii) organic electrooptic material.

31. The integrated optical phase modulator of claim 24, wherein the surface of the electrooptic film is bonded to the surface of the trough with an adhesive.

\* \* \* \* \*